(12) United States Patent
Ledet

(10) Patent No.: US 12,435,815 B2
(45) Date of Patent: Oct. 7, 2025

(54) FLUID FLOW REGULATION ASSEMBLY WITH VIBRATION ATTENUATION

(71) Applicant: GRUNDFOS HOLDING A/S, Bjerringbro (DK)

(72) Inventor: Lasse Søgaard Ledet, Aalborg (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 289 days.

(21) Appl. No.: 17/834,435

(22) Filed: Jun. 7, 2022

(65) Prior Publication Data
US 2022/0390036 A1 Dec. 8, 2022

(30) Foreign Application Priority Data
Jun. 8, 2021 (EP) ..................................... 21178346

(51) Int. Cl.
| | |
|---|---|
| *F16K 47/02* | (2006.01) |
| *F04B 53/00* | (2006.01) |
| *F04D 25/06* | (2006.01) |
| *F04D 29/66* | (2006.01) |
| *F16K 27/00* | (2006.01) |
| *F16K 31/04* | (2006.01) |

(52) U.S. Cl.
CPC ............ *F16K 47/02* (2013.01); *F04B 53/003* (2013.01); *F04D 25/06* (2013.01); *F04D 29/66* (2013.01); *F04D 29/668* (2013.01); *F16K 27/00* (2013.01); *F16K 31/04* (2013.01)

(58) Field of Classification Search
CPC .......... F16K 27/00; F16K 31/04; F16K 47/02; F04B 53/003; F04D 25/06; F04D 29/66; F04D 29/668
See application file for complete search history.

(56) References Cited

U.S. PATENT DOCUMENTS

| | | | | |
|---|---|---|---|---|
| 4,943,216 A | * | 7/1990 | Iio | .......................... F04C 29/128 |
| | | | | 418/270 |
| 7,465,156 B2 | * | 12/2008 | Lee | ...................... F04B 39/0044 |
| | | | | 417/363 |
| 10,797,559 B2 | * | 10/2020 | Thawani | .................. F16F 15/08 |
| 2014/0271242 A1 | | 9/2014 | Calhoun et al. | |
| 2019/0285209 A1 | | 9/2019 | Smith | |
| 2020/0256416 A1 | | 8/2020 | Smith et al. | |

FOREIGN PATENT DOCUMENTS

CN        110848116 A     2/2020

* cited by examiner

*Primary Examiner* — Audrey B. Walter
(74) *Attorney, Agent, or Firm* — McGlew and Tuttle, P.C.

(57) ABSTRACT

A fluid flow regulation assembly (1) includes: movable parts, for being actively mechanically driven, including at least one of a fluid flow regulating body for regulating a fluid flow and a rotor of a motor for driving the regulating body; and power electronics for controlling the motor. The movable parts and/or the power electronics are a source of vibration. Static parts are exposed to traveling vibrations originating from the source of vibration and include at least one of the group: a pump housing (3), a valve housing, a motor housing (5), a pump base and an electronics housing (7). The static parts include a structural element (11) with at least one vibration attenuation section (9) for attenuating vibrations: that originate from the source of vibration; travel along the structural element and have a vibration frequency above a pre-determined minimum vibration frequency ($f_{min}$).

23 Claims, 15 Drawing Sheets

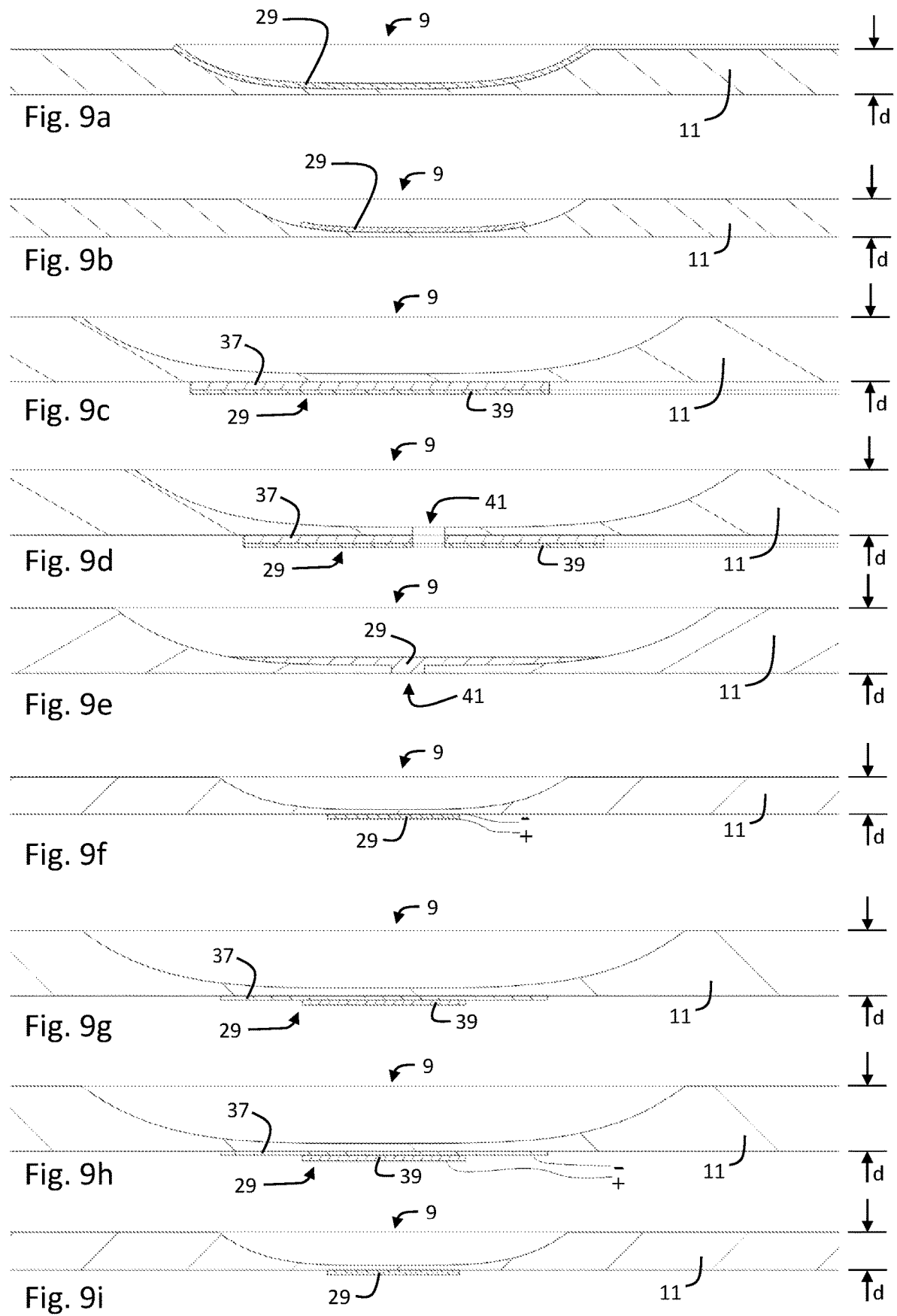

FLUID FLOW REGULATION ASSEMBLY WITH VIBRATION ATTENUATION

CROSS REFERENCE TO RELATED APPLICATIONS

This application claims the benefit of priority under 35 U.S.C. § 119 of European Application 21178346.9, filed Jun. 8, 2021, the entire contents of which are incorporated herein by reference.

TECHNICAL FIELD

The present disclosure is directed to fluid flow regulation assemblies, e.g. pump assemblies or valve assemblies, having movable parts and/or electronics causing vibrations and/or noise.

BACKGROUND

Typically, operating a fluid flow regulation assembly, such as a pump assembly or a valve assembly, generates vibrations and/or noise. The vibrations and/or noise are typically caused by movable parts, e.g. a rotor of a motor, a rotor shaft, a bearing, an impeller, a displacement body, or a valve body, and/or power electronics feeding a motor with electric energy.

Vibrations cause wear and reduce generally the lifespan of the fluid flow regulation assembly or components connected thereto. Noise is generally to be minimized or avoided as much as possible. It is thus a general objective to reduce the vibrations and/or noise of a fluid flow regulation assembly. A typical solution is using damping material for absorbing sound waves and vibrations. However, relatively large amounts of damping material are typically needed to a have a significant effect on the vibration/noise attenuation. Large amounts of damping material, however, are costly in terms of material cost and assembly cost. They may also introduce other problems. such as more space consumption and potential fire hazards.

CN 110848116 A describes an air energy heat pump with vibration attenuation by placing a compressor in a box with sound-absorbing cotton walls and an acoustic black hole noise reduction mechanism installed on the cotton walls to attenuate sound waves originating from the running compressor. That solution is very space-consuming and expensive in terms of material and assembly costs.

SUMMARY

It is an object of the present disclosure to provide a fluid flow regulation assembly with a vibration attenuation that consumes less space, manufacturing cost and that needs none or only small amounts of damping material for effectively attenuating vibrations.

This object is achieved by a fluid flow regulation assembly according to the invention. Preferred embodiments of the fluid flow regulation assembly are described by way of the this disclosure including the description and the figures.

According to the present disclosure, a fluid flow regulation assembly is provided comprising
movable parts for being actively mechanically driven, wherein the movable parts include at least one fluid flow regulating body for regulating a fluid flow and a rotor of a motor for driving the regulating body, and
power electronics for controlling the motor,
wherein the movable parts and/or the power electronics are a source of vibration, wherein the pump assembly further comprises static parts being exposed to traveling vibrations originating from the source of vibration, wherein the static parts include at least one of the group comprising: a pump housing, a valve housing, a motor housing, a pump base and an electronics housing,
characterized in that
the static parts comprise a structural element with at least one vibration attenuation section for attenuating vibrations that
originate from the source of vibration.
travel along said structural element, and
have a vibration frequency above a pre-determined minimum vibration frequency.

So, it is the basic idea of the present invention to integrate the vibration attenuation in form of at least one vibration attenuation section into a structural element of the static parts of the fluid flow regulation assembly, preferably forming a part of an inner surface of a housing wall, e.g. a wall of the electronics housing, the motor housing, the pump housing, the pump base, and/or the valve housing. The fluid flow regulation assembly according to the present disclosure needs none or only small amounts of damping material for effectively attenuating vibrations. The vibration attenuation adds little to none in terms of space consumption. The vibration attenuation is preferably not visible from the outside of the fluid flow regulation assembly, such that a fluid flow regulation assembly with the vibration attenuation may not be distinguished, based on its outer appearance alone, from a fluid flow regulation assembly without the vibration attenuation. The vibration attenuation does not require a change of size, shape or outer appearance of the fluid flow regulation assembly. In fact, the vibration attenuation may be implemented by a specific shape of an inner surface of a housing wall that effectively attenuates vibrations having a vibration frequency above a pre-determined minimum vibration frequency.

As the vibrations originate from a known source of vibration that is part of the fluid flow regulation assembly, the vibrations can be predicted, simulated and/or modelled according to the knowledge about the source of vibration and the vibration propagation along the static parts of the fluid flow regulation assembly. Therefore, the at least one vibration attenuation section can be designed in a simulation process to have an attenuating effect on the vibrations above a pre-determined minimum vibration frequency. The size of the static parts generally sets a limit to the size of the at least one vibration attenuation section. As a general rule, the lower the pre-determined minimum vibration frequency shall be, the larger the area of the at least one vibration attenuation section must be. Thus, the lower limit of vibration frequencies to be able to attenuate is determined by the maximum possible size of the at least one vibration attenuation section.

Optionally, the fluid flow regulation assembly may be a pump assembly, wherein the at least one fluid flow regulating body is an impeller or a displacement body. Alternatively, the fluid flow regulation assembly may be a valve assembly, wherein the at least one fluid flow regulating body is valve body. The inventive vibration attenuation works particularly well for pumps and valves.

Optionally, the structural element may comprise at least one wall section, wherein the at least one vibration attenuation section is arranged at one of the at least one wall section and extends over an area of rotationally asymmetric shape. Simulations have shown that a rotationally asymmetric shape very often performs better in terms of vibration attenuation, because the vibrations do not travel in a rotationally symmetric way along the structural element. The shape of the area of the at least one vibration attenuation section is preferably adapted to the travel paths of vibrations along the structural element.

Optionally, the structural element may comprise at least one wall section, wherein the at least one vibration attenuation section is arranged at one of the at least one wall section and extends over an area of any shape, wherein the area defines a distance D between those two points of the area that have the largest distance to each other in traveling direction of the vibrations, wherein said distance D fulfils the formula $$D \geq 0.5 \frac{c_{red}}{f_{min}},$$

wherein $f_{min}$ is the minimum mum vibration frequency and $c_{red}$ is the speed of sound along the structural element where its material thickness in the at least one vibration attenuation section is minimal. Within the area of the at least one vibration attenuation section, a variation of the material thickness has an attenuating effect on the vibrations, because the speed of sound within the material of the structural element reduces with the material thickness. Thus, a decaying material thickness along the travel path of the vibrations effectively slows the vibrations down so that they can be attenuated more efficiently. If the distance D fulfils the formula $$D \geq 0.5 \frac{c_{red}}{f_{min}},$$

the vibrations above the minimum vibration frequency can be attenuated effectively.

Optionally, the structural element may comprise at least one wall section, wherein the at least one vibration attenuation section is arranged at one of the at least one wall section and extends over an area of any shape, wherein the area defines a first distance A along a first straight virtual line between those two points of the area that have the largest distance to each other, wherein the area defines a second distance B along a second straight virtual line intersecting the center of the first virtual line at a right angle, wherein the second distance B is the distance between those two points of the area on the second virtual line that have the largest distance to each other, wherein the first distance A is at least 10% larger than the second distance B. This preferred embodiment covers more specifically rotationally asymmetric shapes of the area of the at least one vibration attenuation section. In particular, shapes of an oval, a ring section, or banana-like shapes may be very efficient in terms of vibration attenuation.

Optionally, the at least one vibration attenuation section may have a one-sided material thickness decay profile in traveling direction of the vibrations. "One-sided" shall mean in this context that the material thickness decay profile is asymmetric to extend from one side of the at least one vibration attenuation section, but not from the opposite side. So, the structural element gets thinner along the travel path of the vibrations in order to slow the vibrations down, so that they can be attenuated more efficiently. The decay profile also guides the vibrations towards a point, line or area where the at least one vibration attenuation section is thinnest. In case of a one-sided material thickness decay profile, the point, line or area of thinnest material thickness is located at a side region of the at least one vibration attenuation section. Such an asymmetric one-sided decay profile is particularly beneficial if vibrations are expected to come from one predominant direction, because the available area can be more effectively used to attenuate a broader frequency range. In case the vibrations are expected to travel towards the at least one vibration attenuation section in two directions opposite to each other, the at least one vibration attenuation section may have a "two-sided" material thickness decay profile, for which two decay profiles may be arranged symmetrically to each other. i.e. both decaying symmetrically along the travel path of the vibrations towards a common center of minimal thickness. If the vibrations traveling towards the at least one vibration attenuation section in two directions opposite to each other are expected to be different. e.g. in terms of vibration frequencies, the at least one vibration attenuation section may have a two-sided material thickness decay profiles with two decay profiles arranged asymmetrically to each other, wherein the difference between the decay profile reflects the expected difference between the vibrations. In general, vibrations may be absorbed most efficiently at the point, line or area where the at least one vibration attenuation section is thinnest. For example, the decay profile may be parameterized as a material thickness h(x) as a function of a location variable $x \in [0,1]$ along the decay profile against the travel direction of the vibrations by $$h(x) = \varepsilon x^m,$$

wherein $\varepsilon \ll 1$ is a small value determining the inverse of the size of the area of the at least one vibration attenuation section and $m \geq 1$, preferably $m \geq 2$, is an exponent value determining the steepness of the decay profile.

Optionally, the structural element may comprise a material thickness smoothly and/or stepwise reducing in a traveling direction of the vibrations from a rim of the at least one vibration attenuation section having a maximum material thickness to a point, line or area of minimum or zero material thickness of the at least one vibration attenuation section. A smooth decay profile is generally preferred, but a stepwise decay profile is still efficient if the steps are small enough to avoid reflections of vibrations at the steps. The steps should be small enough, e.g. magnitudes smaller than the wavelength of the vibrations, for the vibrations to appear as smooth or negligibly non-smooth. For example, the structural element may be additively manufactured or processed by milling, and a non-smoothness on a microscopic scale by inherent material steps of less than a tenth of the material thickness outside of the at least one vibration attenuation section may be considered negligible here.

Optionally. the at least one vibration attenuation section has the functionality of an acoustic black hole (ABH) in the structural element. The theoretical concept of ABH is in principle known from academic literature describing theoretic scenarios and simulations of vibration propagation along endless planes under laboratory conditions. However, there are little to none practical applications of ABH in real-world products. The inventors of the fluid flow regulation assembly according to the present disclosure found that the principal functionality of an ABH is applicable, at least for vibration frequencies above a pre-determined minimum vibration frequency, for fluid flow regulation assemblies that produce the vibrations/noise by movable parts and/or electronics and that have static parts with structural elements along which the vibrations travel. The at least one vibration attenuation section may in fact be an ABH formed into the structural element as one of the static parts of the fluid flow regulation assembly.

Optionally, the structural element may comprise at least one support structure, such as a rib or a web, extending at least partly across the at least one vibration attenuation section. This is beneficial to ensure structural stability and integrity if the material thickness in the at least one vibration attenuation section is below a certain threshold. The attenuation effect is generally better if the decay profile of the material thickness goes down to very small values in order to stronger reduce the speed of sound and thus achieve a better attenuation effect. The at least one support structure may provide for structural stability while allowing a decay profile of the material thickness to reduce to smaller thicknesses.

Optionally, the at least one support structure, such as a rib or a web, may be defined by a locally non-reduced or less reduced material thickness of the structural element. Thus, the at least one support structure does not need to be an extra part. Preferably, the at least one support structure is an integral part of the structural element. Preferably, the structural element is a plastic component being molded as a single integral piece, including the at least one vibration attenuation section and the at least one support structure. For instance, it could be a housing, a housing lid or cap, or a housing wall.

Optionally, the structural element may define a predictable main path of travel of the vibrations along said structural element, wherein the predictable main path of travel extends from a first structure section of the structural element towards a second structure section of the structural element, wherein the at least one vibration attenuation section is arranged between the first structure section and the second structure section. This is a preferred embodiment if the main path of travel of the vibrations is predictable, e.g. by simulations or tests. Areas of the at least one vibration attenuation section in form of a ring section or a banana-like shape may be very efficient for this.

Optionally, the at least one vibration attenuation section may separate a first structure section of the structural element and a second structure section of the structural element, wherein the first structure section is exposed to traveling vibrations caused by the source of vibration and the second structure section receives essentially only vibrations below the pre-determined minimum vibration frequency and/or vibrations attenuated by the at least one vibration attenuation section. Thus, the at least one vibration attenuation section may "protect" the second structure section, and potentially further static parts connected thereto, from vibrations. The first structure section may be exposed to the vibrations originating from the source of vibration, whereas the second structure section may be protected due to the at least one vibration attenuation section that attenuate(s) the vibrations before they can reach the second structure section.

Optionally, the structural element may comprise a first material having a first Young modulus, and wherein the at least one vibration attenuation section is at least partly covered by or equipped with a dampening element comprising a second material with a second Young modulus, wherein the second Young modulus is smaller than the first Young modulus. The amount of dampening material, i.e. the second material with the smaller Young modulus, is relatively low, because a dampening element in form of a relatively thin layer has already a very efficient dampening effect for absorbing vibrations and/or noise. In fact, a thinner dampening element may have under circumstances better dampening performance than a thicker dampening element. The dampening element may be attached to, e.g. by gluing, the at least one vibration attenuation section. The dampening element may cover an inner side and/or an outer side of the structural element. Alternatively, or in addition, the dampening element may be integrated into the structural element, in at least part of the at least one vibration attenuation section, in form of a sandwiched layer structure. Alternatively, or in addition, the dampening element may be sandwiched layer structure of materials with high and low Young modulus, wherein the sandwiched layer structure is attached to at least part of the at least one vibration attenuation section.

Optionally, the structural element may comprise a plurality of wall sections defined by at least one inner or outer edge between the wall sections, wherein the at least one vibration attenuation section is arranged at a largest one of the wall sections and/or at one of the wall sections being located closest to the source of vibration. Preferably, the structural element is a housing part, e.g. an electronics housing, a housing lid or cap. Preferably, the structural element is a molded plastic component defining wall sections separated by at least one inner or outer edge. In the design process of the structural element, the largest wall section is the preferred choice for placing the at least one vibration attenuation section. because the at least one vibration attenuation section can extend over the largest area, which is beneficial to attenuate vibration frequencies with a low vibration frequency. In other words, the larger the area of the at least one vibration attenuation section is, the lower the pre-determined vibration frequency minimum can be set. Furthermore, the largest one of the wall sections has potentially the highest risk of radiating noise sound waves by resonant oscillations caused by the vibrations. Thus, noise is efficiently reduced by choosing the largest one of the wall sections for vibration attenuation.

Optionally, the structural element may comprise at least one wall section, wherein the at least one vibration attenuation section extends over an area of at least 25 percent, preferably at least 50 percent, of one of the at least one wall section. As stated before, it is preferred to cover a maximum available area with the at least one vibration attenuation section in order to have an attenuation effect in a maximum range of vibration frequencies. However, structural or functional limitations may set a limit to the maximum available area on a wall section for accommodating the at least one vibration attenuation section.

Optionally, the structural element may comprise at least one wall section, wherein a plurality of vibration attenuation sections is arranged at the at least one wall section, wherein the vibration attenuation sections are separated from each other by at least one support structure, such as a rib or a web. This embodiment is beneficial if an attenuation effect over a large range of vibration frequencies is not the prime goal. For instance, if only high frequencies are to be attenuated, smaller vibration attenuation sections may suffice. More vibration attenuation sections may more efficiently attenuate these vibrations, in particular is case of vibrations traveling in less predictable directions. The support structure may be similar to the support structure described before for extending at least partly across a larger vibration attenuation section.

Optionally, the structural element may be at least part of the electronics housing accommodating motor control electronics. As vibrations may have a negative effect on the lifespan of expensive parts of the motor control electronics, e.g. a frequency converter, it is beneficial on the one hand to protect motor control electronics from vibrations as much as possible. On the other hand, motor control electronics may comprise power electronics, e.g. a frequency converter, that generate vibrations and/or noise itself.

Optionally, the at least one vibration attenuation section may extend in a traveling direction of the vibrations for at least three times of the material thickness that the structural element has outside of the at least one vibration attenuation section. This constitutes a minimum area over which the at least one vibration attenuation section should extend to have a sufficient attenuation effect.

Optionally, the at least one vibration attenuation section may have a material thickness equal to or larger than a minimum material thickness, wherein the minimum material thickness is equal to or smaller than half of the material thickness that the structural element has outside of the at least one vibration attenuation section. In other words, the material thickness should at least decay by 50%. It should be noted that the at least one vibration attenuation section may comprise a point, a line or an area having the minimum material thickness. In an alternative embodiment, the at least one vibration attenuation section may comprise a hole in the structural element which may be open or covered and/or filled by the dampening element.

Optionally, the at least one vibration attenuation section may have a material thickness equal to or larger than a minimum material thickness, wherein the speed of sound $c_{red}$ at the minimum material thickness is equal to or smaller than $1/\sqrt{2}$ of the speed of sound $c_{ref}$ at the material thickness that the structural element has outside of the at least one vibration attenuation section. This is beneficial to ensure that vibrations above the minimum vibration frequency are attenuated by at least 50%.

Optionally, the at least one vibration attenuation section may have a material thickness decay profile in traveling direction of the vibrations, wherein the material thickness decay profile has a smoothly and/or stepwise reducing steepness in traveling direction of the vibrations. In other words, the absolute value of the second derivative of the material thickness as a function of location along the travel path of the vibrations is non-zero along the decay profile. It should be noted that the at least one vibration attenuation section may comprise an area having a minimum material thickness where the material thickness does not decay further. In case of a stepwise reducing steepness, the steepness shall be defined as a steepness averaged or interpolated over at least one step length.

In order to reduce the risk of reflections, an upper limit is preferably applied for the steepness of thickness decay, i.e. for the first derivative of the material thickness as a function of location along the travel path of the vibrations along the decay profile. The steepness of the thickness decay may be highest at a rim of the at least one vibration attenuation section. where the vibrations enter the at least one vibration attenuation section. The steepness $$\frac{dh}{dx}$$

of the decay of the material thickness h(x) may fulfil the following border condition for all values of $x \in [0,1]$, wherein x is a normalized location variable along the decay profile against the traveling direction of the vibrations, i.e. x=0 at the minimum thickness of the decay profile and x=1 at the maximum thickness of the decay profile:

$$\frac{dh}{dx} \leq \left| \sqrt{2\pi d f_{min}} \left( \frac{12\rho}{E} \right)^{0.25} \right|,$$

wherein d is the material thickness of the structural element outside of the at least one vibration attenuation section, $f_{min}$ is the minimum vibration frequency, p is the density of the material of the structural element and E is the Young modulus of the material of the structural element. If the vibration attenuation section extends over a relatively small area, i.e. for small values of the distance D, the steepness $$\frac{dh}{dx}$$

of the thickness decay may reach the following maximum steepness at the rim of the vibration attenuation section, i.e. for x=1:

$$\left. \frac{dh}{dx} \right|_{x=1} \approx \left| \sqrt{2\pi d f_{min}} \left( \frac{12\rho}{E} \right)^{0.25} \right|.$$

Optionally, the at least one vibration attenuation section may be at least partly covered by an active, semi-active or passive dampening element. For instance, the dampening element may comprise at least one of the group comprising:
  a coating,
  an adhesive,
  a pad,
  a gel,
  a gasket material,
  one or more polymeric films,
  a sandwich structure of different layers of material,
  a sandwich structure of different layers of stiffness,
  a piezo element transforming energy of the vibrations into electric energy being harvested or transformed into heat by an electrical resistance,
  a vibration sensing element for measuring the vibrations,
  a PVDF (polyvinylidene fluoride or polyvinylidene difluoride) film, and
  a quartz crystal.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

Embodiments of the present disclosure will now be described by way of example with reference to the following figures of which:

FIG. 2b is a perspective longitudinal cut view on an inner side of a structural element of the example of a fluid flow regulation assembly of FIG. 2a;

FIG. 3b is a perspective longitudinal cut view on an inner side of a structural element of the example of a fluid flow regulation assembly according to FIG. 3a;

FIG. 6b is a perspective sectional cut view of another example of a structural element of the fluid flow regulation assembly according to FIG. 6a;

FIGS. 9a, 9b, 9c, 9d, 9e, 9f, 9g, 9h, and 9i are detailed longitudinal cut views of a vibration attenuation section of an example of a structural element with different embodiments and positions of a dampening element of a fluid flow regulation assembly according to the present disclosure;

FIG. 10b is a longitudinal cut view of the example of a structural element of the fluid flow regulation assembly according to FIG. 10a;

FIG. 10c is a perspective sectional cut view of another example of a structural element of the fluid flow regulation assembly according to FIG. 10a;

FIG. 11b is a longitudinal cut view of the example of the structural element of a fluid flow regulation assembly according to FIG. 11a;

FIG. 11c is a perspective sectional cut view of the example of the structural element of a fluid flow regulation assembly according to FIG. 11a;

FIG. 12b is a perspective sectional cut view of the example of the structural element of a fluid flow regulation assembly according to FIG. 12a;

FIG. 13b is longitudinal cut view of another example of the structural element of a fluid flow regulation assembly according to FIG. 13a;

FIG. 13c is a perspective sectional cut view of the example of the structural element of a fluid flow regulation assembly according to FIG. 13a;

DETAILED DESCRIPTION

Figure 1A:
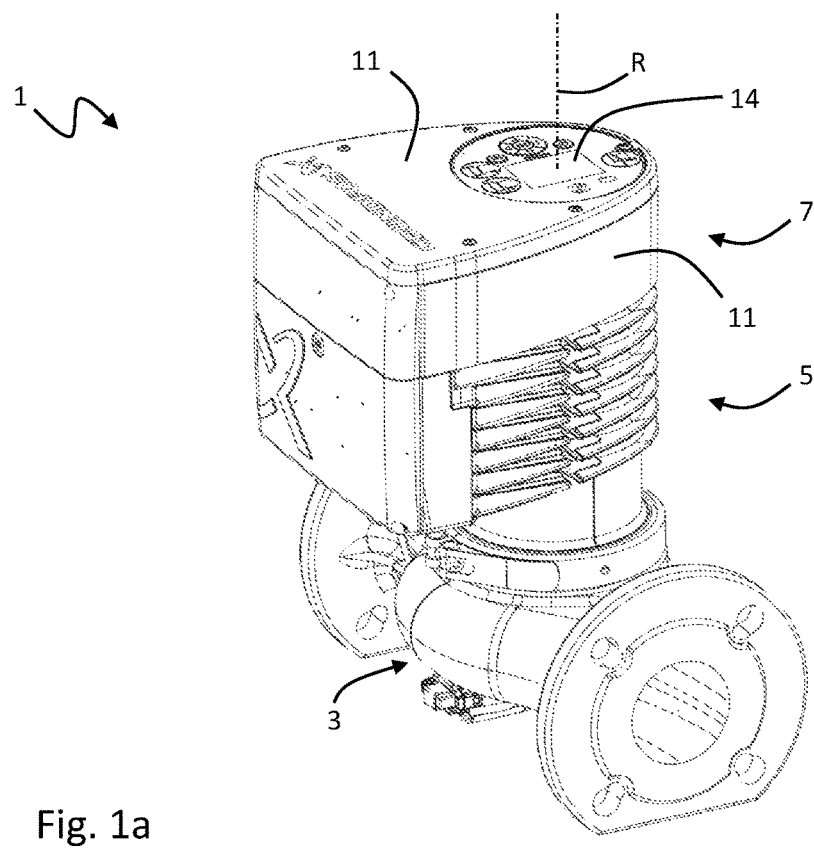
FIGS. 1a and 1b are perspective views of different embodiments of a fluid flow regulation assembly according to the present disclosure.

FIG. 1a,b show two different examples of a fluid flow regulation assembly 1 in form of a pump assembly comprising a pump housing (impeller pump housing) 3, a motor housing 5, and an electronics housing 7. The pump housing 3, the motor housing 5 and the electronics housing 7 are static parts of the pump assembly 1. The pump housing 3 accommodates an impeller (not visible) driven to rotate about a rotor axis R by a rotor shaft (not visible) extending along the rotor axis R. The rotor shaft is driven by a rotor (not visible) of a permanent magnet synchronous motor (PMSM) residing within the motor housing 5. The rotor, the rotor shaft and the impeller are movable parts of the pump assembly 1 that are actively mechanically driven. The impeller is a fluid flow regulating body that regulates and/or drives a fluid flow through the pump housing 3. The electronics housing 7 comprises power electronics for controlling the motor within the motor housing 5. The power electronics comprises a frequency converter for controlling the speed of the motor.

The movable parts of the pump assembly 1, e. g. the rotor, the rotor shaft, and the impeller, as well as the power electronics are sources of vibration that travel along the static parts, e. g. the pump housing 3, the motor housing 5 and the electronics housing 7. Such vibrations generate noise and/or negatively affect the life span of the pump assembly 1 or parts thereof. Therefore, there is a general interest in keeping the vibrations traveling along the pump assembly 1 as small as possible. Therefore, the pump assembly 1 is equipped with a vibration attenuation system in order to attenuate vibrations originating from the movable parts and/or the power electronics.

Figure 1B:
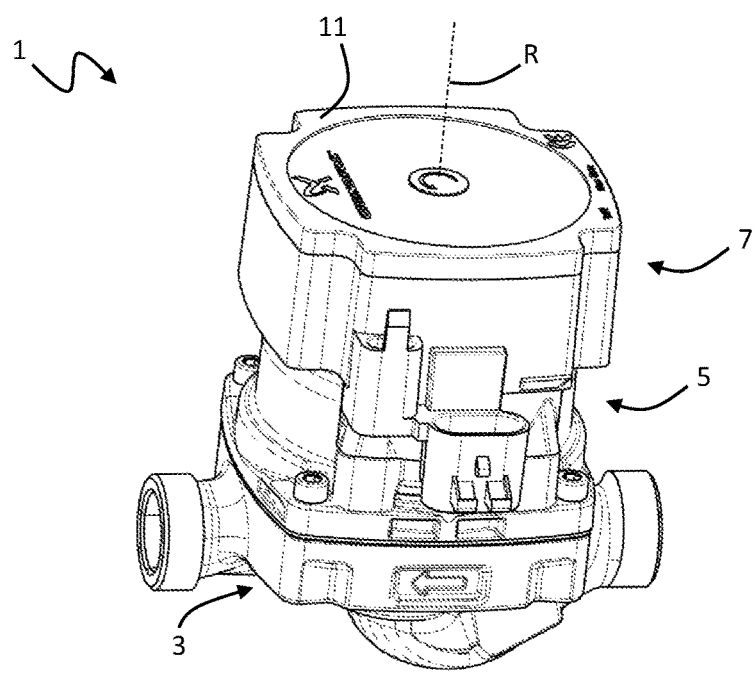
Figure 2A:
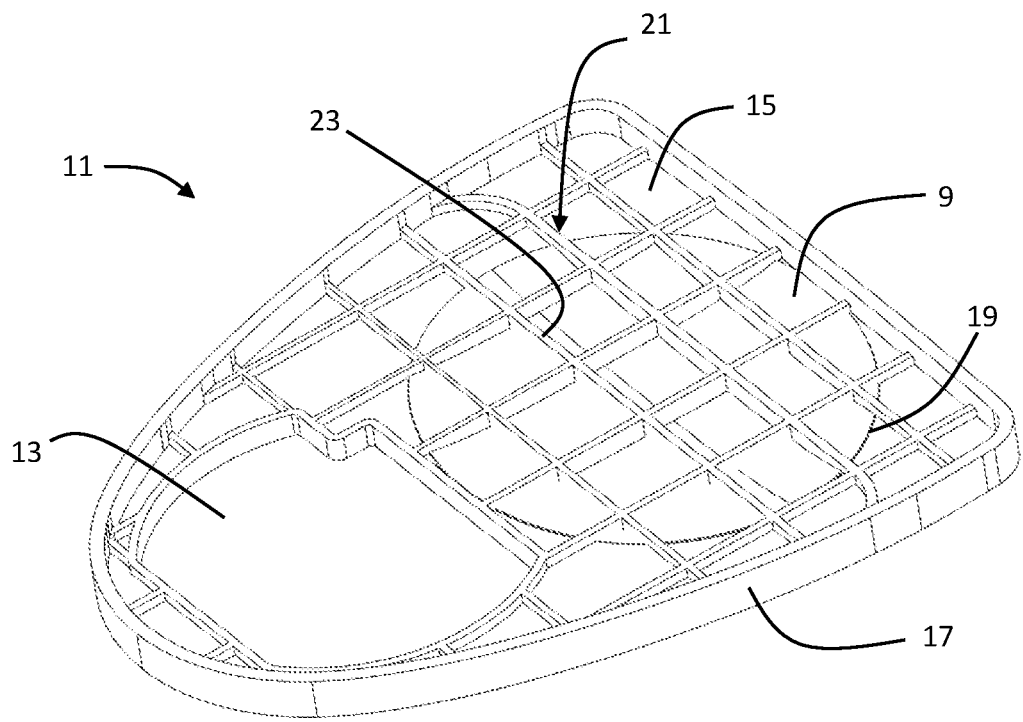
FIG. 2a is a perspective view on an inner side of a structural element of an example of a fluid flow regulation assembly according to the present disclosure.

The vibration attenuation system is implemented in form of at least one vibration attenuation section 9 of a structural element 11 of which at least one of the static parts of the pump assembly 1 is composed of. For instance, the structural element 11 may be a main body, a lid and/or a cap of the pump housing 3, of the motor housing 5 and/or the electronics housing 7. In FIG. 1a, the structural element 11 is a lid the electronics housing 7 as shown in FIGS. 2a,b and 3a,b, or a main body of the electronics housing 7 as shown in FIGS. 4 to 8. In FIG. 1b, the structural element 11 is a lid the electronics housing 7 as shown in FIGS. 10a-c to 13a-c.

Figure 2B:
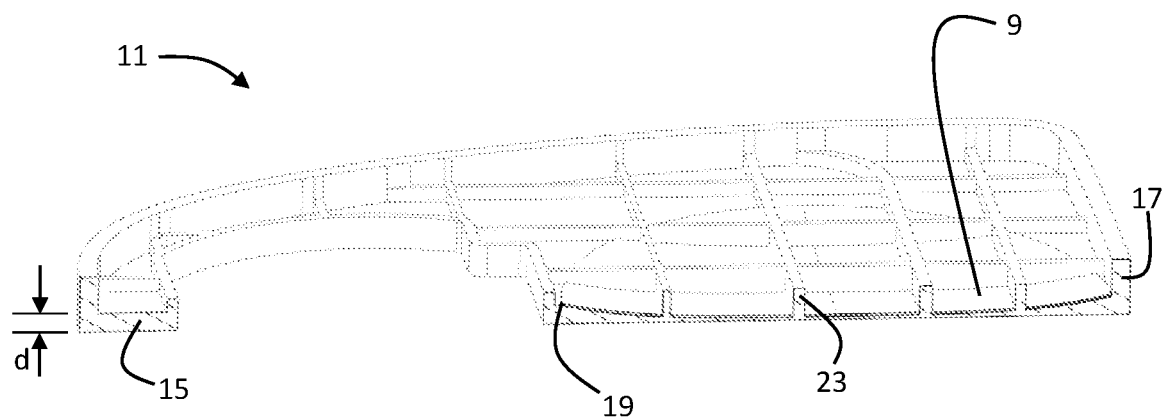

FIG. 2a shows a perspective view on the inner side of the structural element 11 in the form of a lid or cover of the electronics housing 7 as shown in FIG. 1a. The structural element 11 predominately forms a front face of the electronics housing 7 with an opening 13 for a display and/or a human-machine interface (HMI) 14 (see FIG. 1a). The structural element 11 defines a front wall 15 of the electronics housing 7 and a circumferential side wall 17. The front wall is the largest wall section of the structural element 11. A large fraction of the front wall 15 of the structural element 11 defines the vibration attenuation section 9 extending over an essentially circular area at the inner side of the front wall 15 of the structural element 11. As shown in FIG. 2b, the front wall 15 of the structural element 11 has a nominal material thickness d outside of the vibration attenuation section 9. The vibration attenuation section 9 is characterized by a decay profile in material thickness, wherein the material thickness h reduces from the nominal material thickness d at a rim 19 of the vibration attenuation section 9 towards the center of the vibration attenuation section 9. The material thickness h(x) is minimal at the center of the vibration attenuation section 9. The vibration attenuation section 9 may have just a central point or a central area of minimal material thickness h(x=0), wherein x∈[0,1] is a normalized location variable in the interval from 0 at minimal material thickness to 1 at the nominal material thickness d.

The vibration attenuation section 9 is designed to attenuate vibrations traveling from the side walls 17 along the front wall 15 and entering the vibration attenuation section 9 at the rim 19. Due to the decay profile of the material thickness, the propagation of the vibrations along the front wall 15 is slowed down towards the center of the vibration attenuation section 9. Thereby, vibration frequencies above a minimum vibration frequency are effectively attenuated by the vibration attenuation section 9. The larger the vibration attenuation section 9 is, the lower the vibration frequencies are that can be effectively attenuated. Thus, the minimum vibration frequency is determined by the size of the area covered by the vibration attenuation section 9. Thus, the vibration attenuation section 9 is chosen to be as large as possible given the outer dimensions of the structural element 11 and the front wall 15.

In order to provide sufficient structural integrity and stability for the structural element 11, it is comprised with a support structure 21 in the form of a grid of ribs or webs 23 extending across the vibration attenuation section 9. The support structure 21 is formed as an integral part of the structural element 11, which is preferably a plastic component molded as an integral single piece. As it can be seen in FIG. 2a, the structural strength of the ribs or webs 23 may be chosen to be higher in those areas of the vibration attenuation section 9, where the material thickness h(x) is smaller. Accordingly, the ribs or webs 23 can be less strong where the vibration attenuation section 9 is thicker.

Figure 3A:
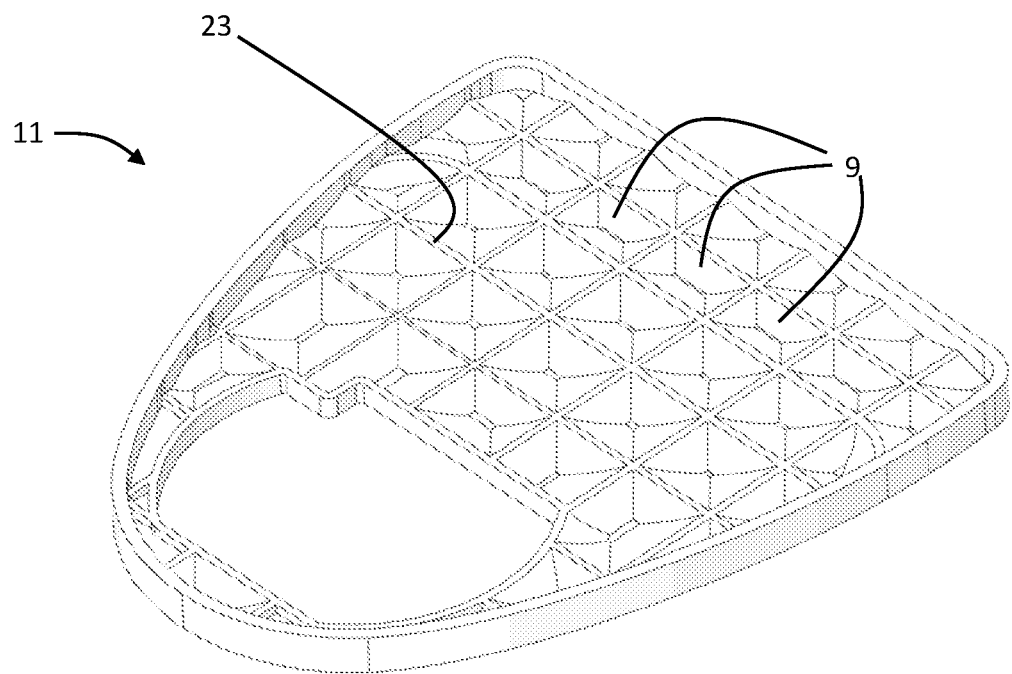
FIG. 3a is a perspective view on an inner side of a structural element of another example of a fluid flow regulation assembly according to the present disclosure.
Figure 3B:
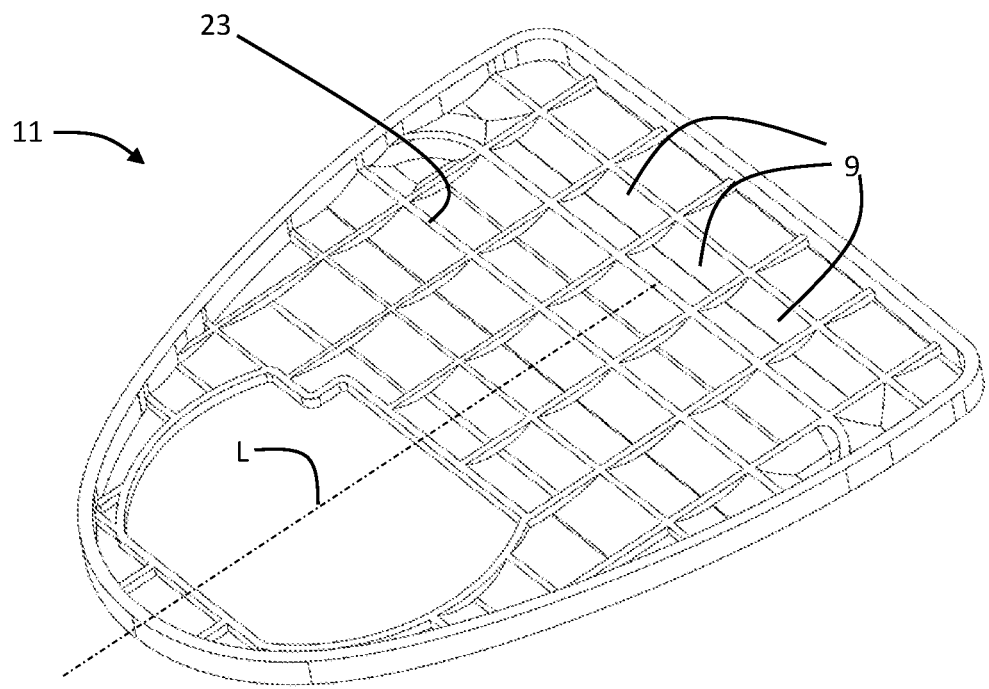

FIGS. 3a, b show two other embodiments of the structural element 11, wherein the structural element 11 comprises a plurality of vibration attenuation sections 9. The area covered by each of the vibration attenuation sections 9 is in these embodiments confined to the area between the ribs or webs 23 of the support structure 21. Thus, the ribs and webs 23 separate the vibration attenuation sections 9 from each other. Due to the smaller size of the area covered by each vibration attenuation section 9, the predetermined minimum vibration frequency is higher for these embodiments. However, the plurality of vibration attenuation sections 9 may be beneficial in terms of efficiently attenuating higher frequencies of vibrations. The embodiment of FIG. 3a is designed to receive vibrations traveling along the front wall 15 of the structural element 11 in any direction. Simulations and tests may show that the vibrations from the known sources of vibration, e. g. the movable parts and/or the power electronics, travel predominantly along certain axes, e. g. the longitudinal axis L as shown in FIG. 3b. Thus, the embodiment of FIG. 3b is optimized to attenuate vibrations traveling in a longitudinal direction L along the structural element 11.

Figure 4:
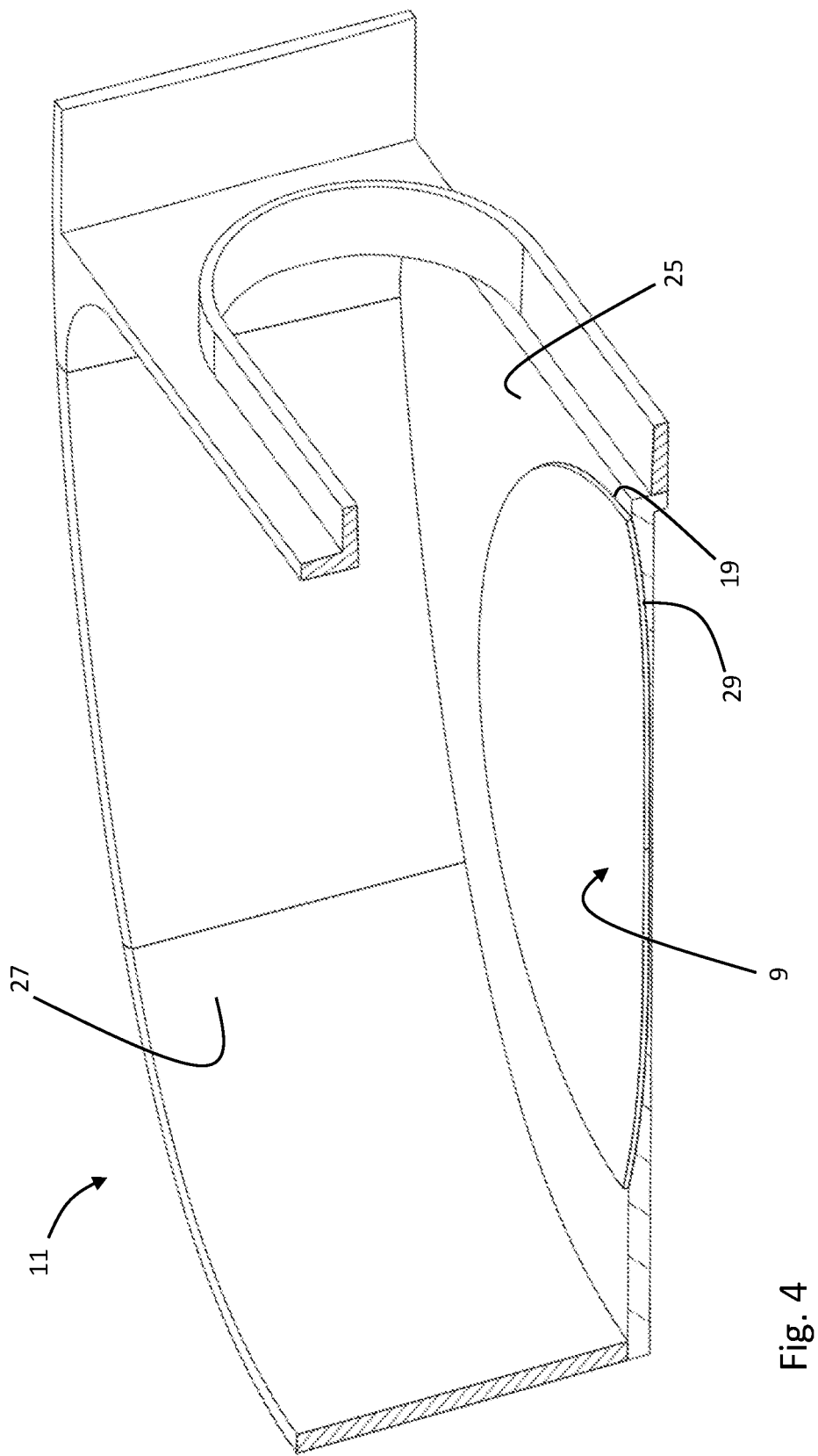
FIG. 4 is a perspective longitudinal cut view of a different structural element of an example of a fluid flow regulation assembly according to the present disclosure.

FIG. 4 shows a main body of an electronics housing 7 as a structural element 11 (see FIG. 1a) comprising a vibration attenuation section 9 at a rear wall 25 facing towards the motor housing 5. Similar to the embodiment shown in FIG. 2a, the vibration attenuation section 9 extends over a majority of the rear wall 25 in a circular area characterized by a certain decay profile of the material thickness of the rear wall 25. The structural element 11 further comprises a side wall 27 complementing the side wall 17 of the lid shown in FIGS. 2a, b and 3a,b.

The vibration attenuation section 9 is in this embodiment covered by a dampening element 29 comprising a softer material than the material of the structural element 11. In other words, the structural element 11 comprises a first material having a first Young modulus and the dampening element 29 comprises a second material with a second Young modulus, wherein the second Young modulus is smaller than the first Young modulus. The softer dampening element 29 is beneficial for absorbing the vibrations that are slowed down by the vibration attenuation section 9.

Figure 5A:
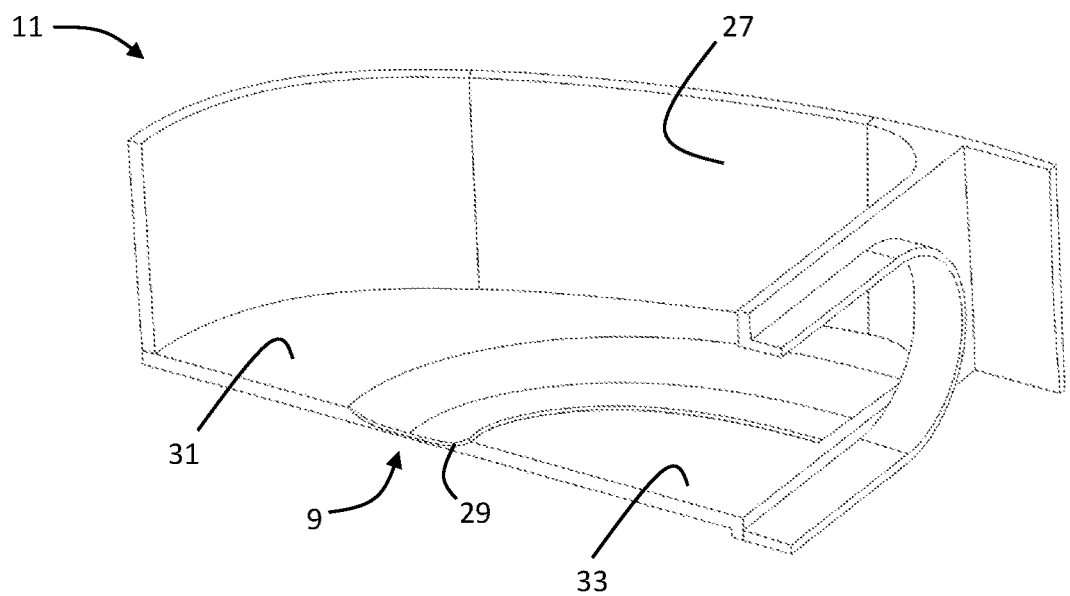
FIGS. 5a and 5b are perspective longitudinal cut views of another example of a structural element of a fluid flow regulation assembly according to the present disclosure.
Figure 5B:
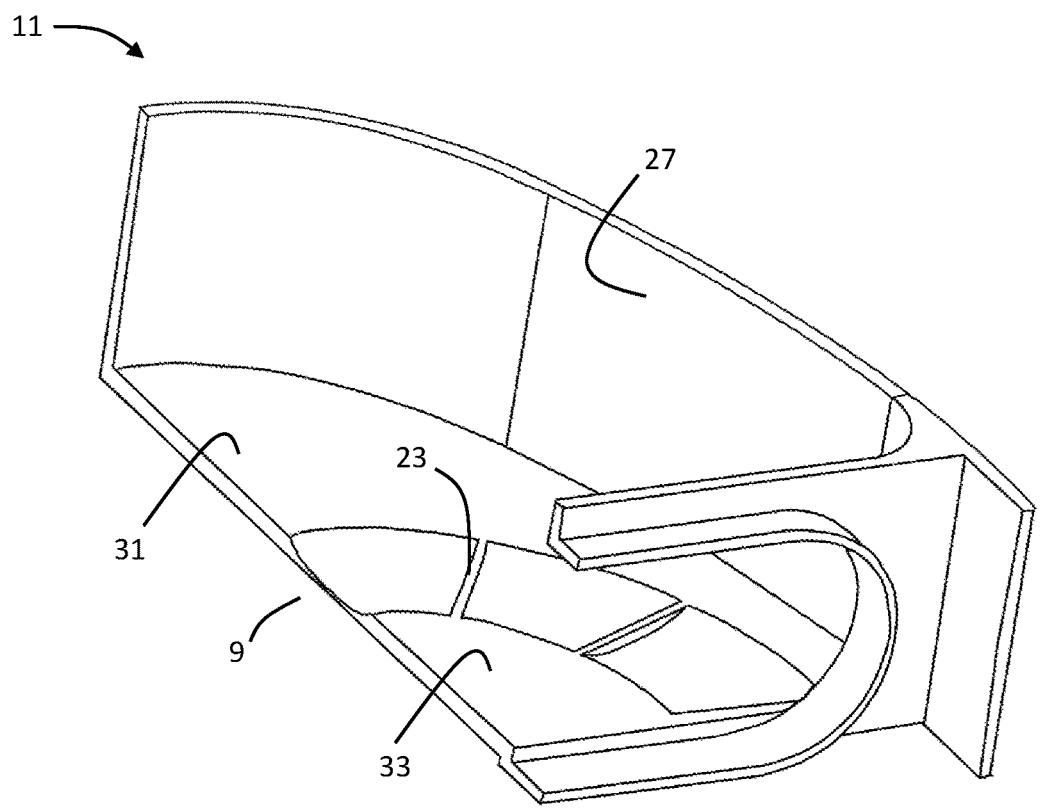

FIGS. 5a,b show different embodiments of the structural element 11. In contrast to the embodiments shown in FIG. 4, the vibration attenuation section 9 does not have a circular shape, but extends asymmetrically over the rear wall 25 of the structural element 11 in form of an annulus, arc, or banana-like shape. The range of vibration frequencies may be smaller for the embodiments of FIGS. 5a,b compared to the embodiment of FIG. 4, but may be very efficient in protecting certain structure sections of the structural element 11 from propagating vibrations. The vibration attenuation section 9 separates or "fences" here a first structure section 31 of the structural element 11 from a second structure section 33 of the structural element 11. The structure sections 31, 33 are here part of the rear wall 25 outside of the vibration attenuation section 9. If the first structure section 31 is exposed to traveling vibrations caused by the source of vibration, the vibration attenuation section 9 attenuates vibrations below the predetermined minimum vibration frequency, so that these traveling vibrations do not reach the second structure section 33, or at least only significantly attenuated. The decay profile of the vibration attenuation section 9 shown in FIGS. 5a, b is designed to also attenuate vibration traveling from the second structure section 33 towards the first structure section 31 as well as in the opposite direction from the first structure section 31 towards the second structure section 33. So, the vibration attenuation section 9 has here a two-sided decay profile, wherein two decay profiles are symmetrically arranged to each other, so that the material thickness reduces towards a common center line. This is particularly beneficial if both the first structure section 31 and the second structure section 33 are exposed to sources of vibration that should not reach the other one of the structure sections 33, 31 unattenuated. Similar to the embodiment shown in FIG. 4, the embodiment shown in FIG. 5a comprises a dampening element 29 covering the vibration attenuation section 9. In contrast to the embodiment shown in FIG. 5a, the embodiment shown in FIG. 5b comprises a support structure 21 in form of ribs or webs 23 extending across the vibration attenuation section 9 in order to improve the structural integrity. The ribs or webs 23 may simply be formed by locally non-reduced material thickness across the vibration attenuation section 9 as shown in FIG. 5b.

Figure 6A:
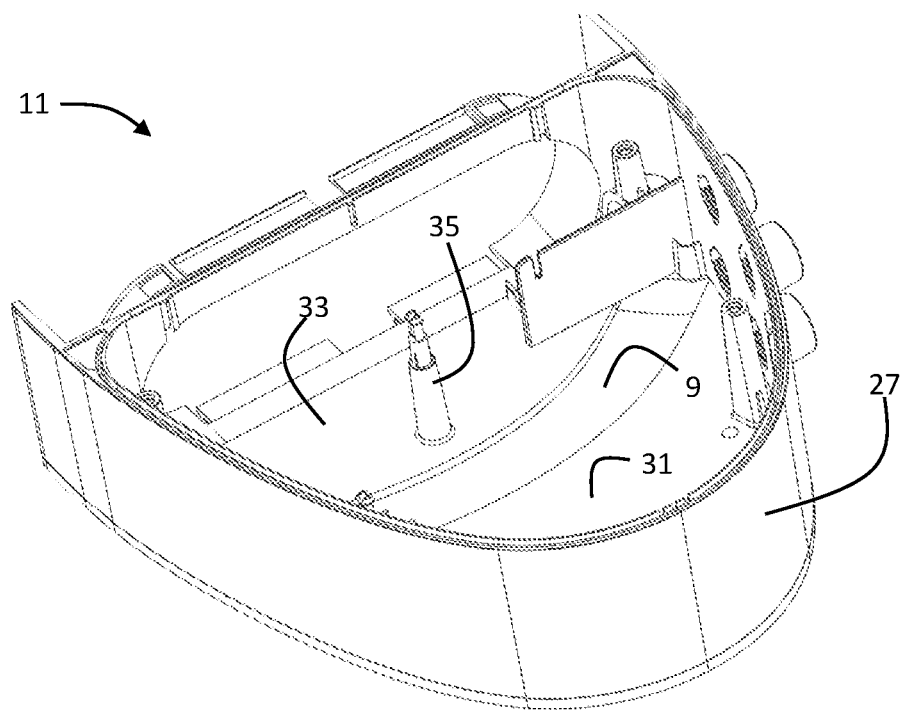
FIG. 6a is a perspective view of another example of a structural element of a fluid flow regulation assembly according to the present disclosure.
Figure 6B:
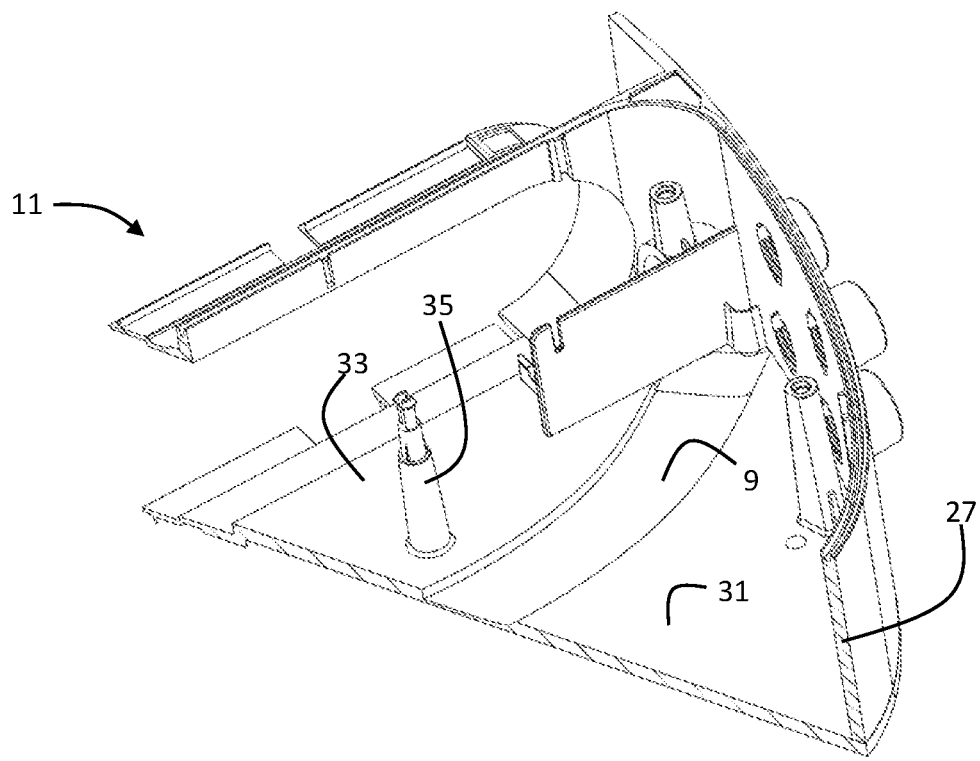

The embodiment of the structural element 11 shown in FIGS. 6a, b is very similar to the embodiment shown in FIG.

5a. However, the decay profile is one-sided here, i.e. asymmetric in the sense that the vibration attenuation section 9 is designed to attenuate predominantly only vibrations traveling from the first structure section 31 of the structural element 11 towards the second structure section 33 of the structural element 11. This is beneficial if simulations or tests show that the first structure section 31 is much more exposed to traveling vibrations originating from the source of vibration than the second structure section 33. Due to the longer extension of the decay profile in traveling direction of the vibrations, the embodiment of FIGS. 6a,b is able to attenuate a wider frequency range of vibrations compared to the embodiment shown in FIGS. 5a,b. The structural element 11 may comprise one or more mounting points 35 at the second structure section 33 for mounting a printed circuit board comprising electronics. If the first structure section 31 is exposed to vibrations caused by movable parts of the pump assembly 1, the vibration attenuation section 9 separating the first structure section 31 from the second structure section 33 efficiently attenuates those vibrations and thereby protects the printed circuit board with the electronics from those propagating vibrations.

Figure 7A:
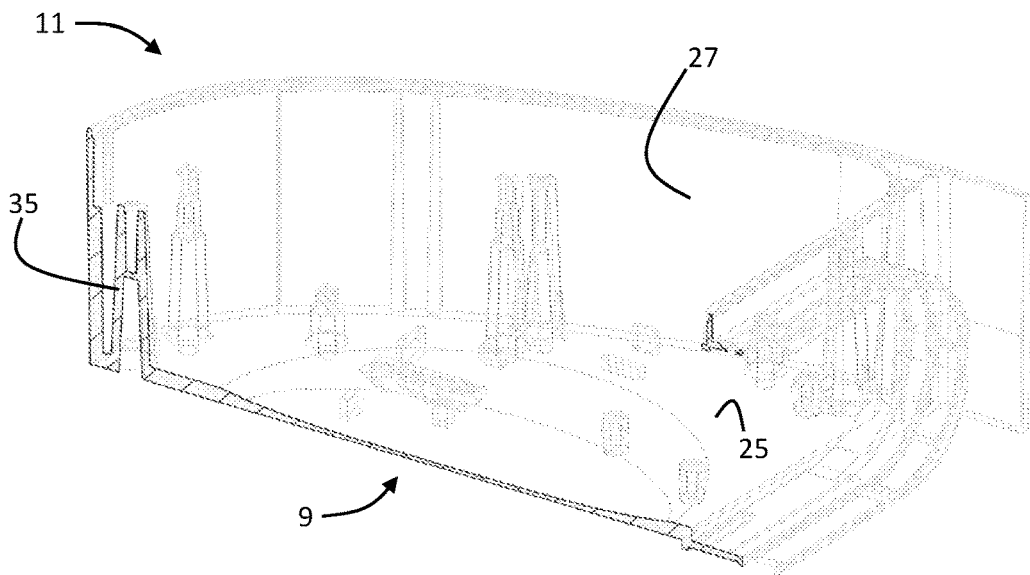
FIG. 7a is a perspective sectional cut view of different examples of a structural element of a fluid flow regulation assembly according to the present disclosure.
Figure 7B:
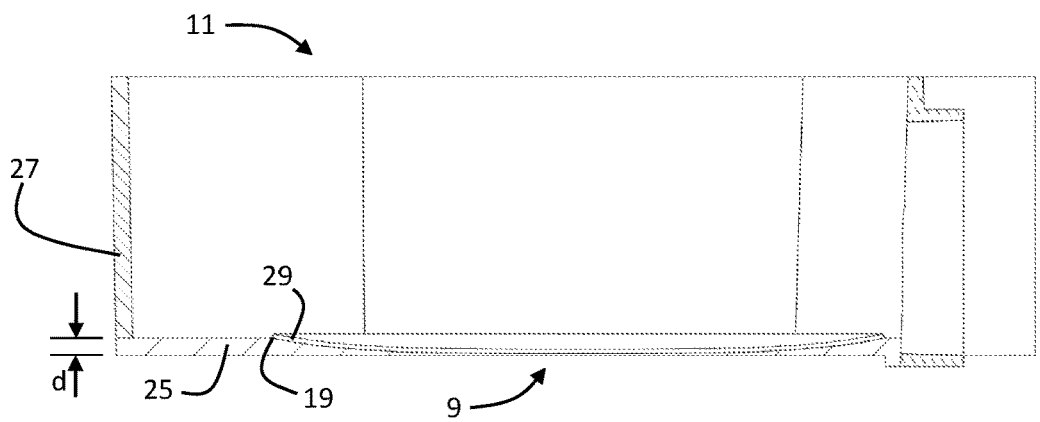
FIG. 7b is a longitudinal cut view of different examples of a structural element of a fluid flow regulation assembly according to the present disclosure.
Figure 7C:
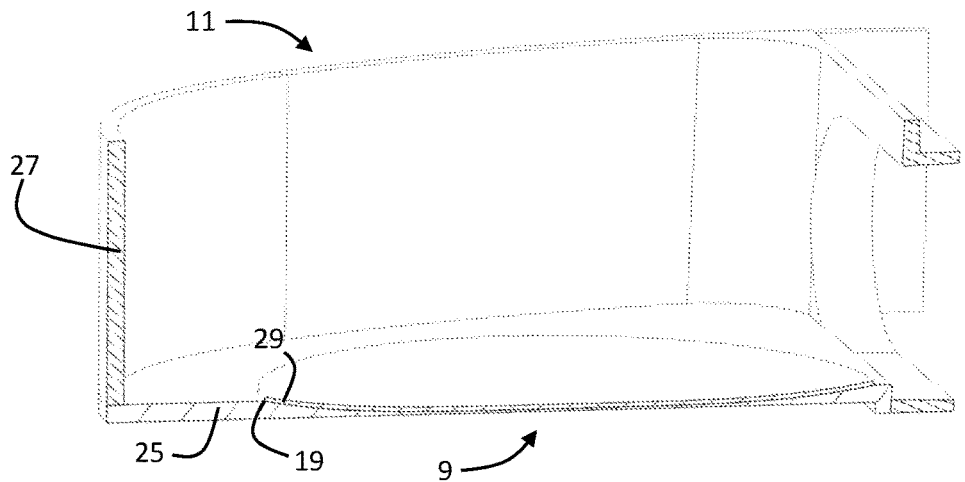
FIG. 7c is a perspective sectional cut view of different examples of a structural element of a fluid flow regulation assembly according to the present disclosure.
Figure 8:
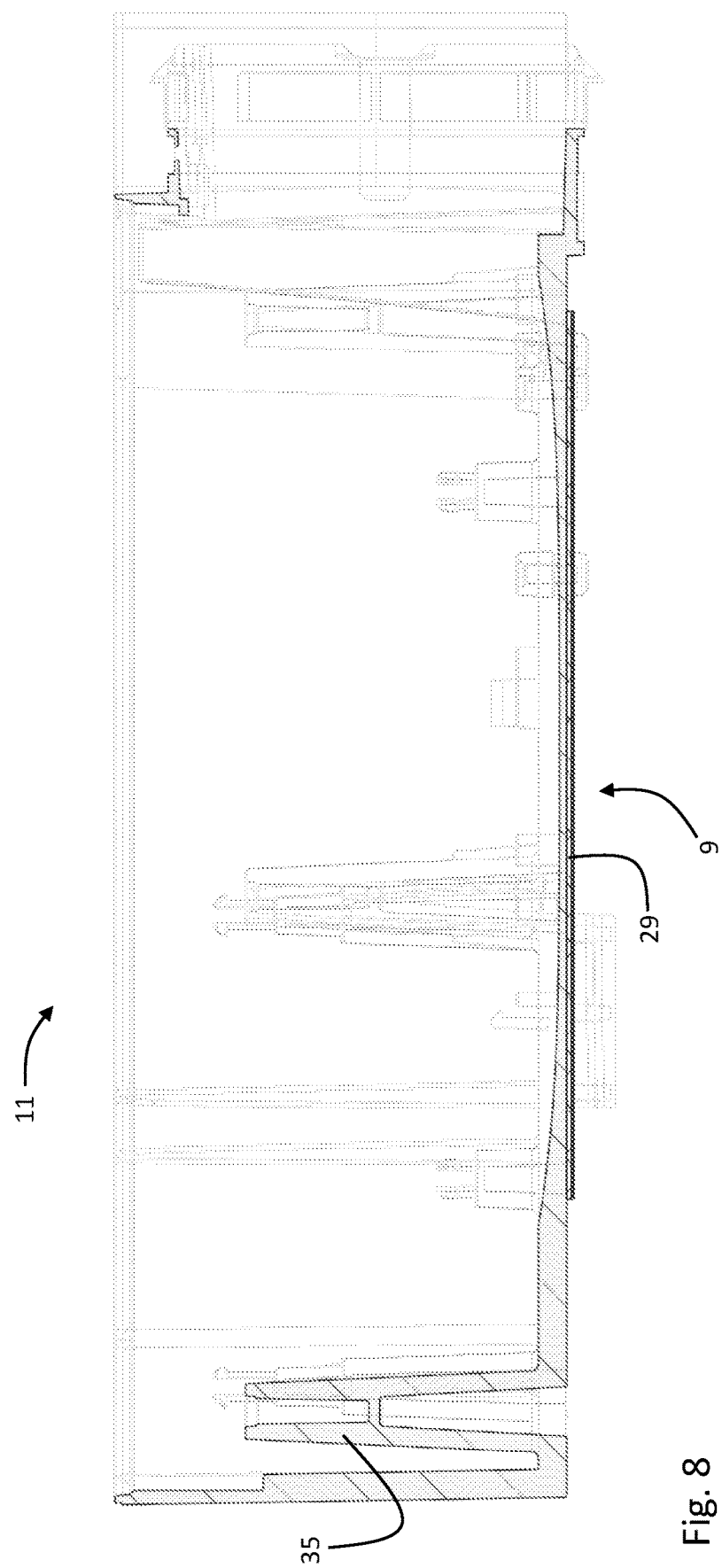
FIG. 8 is a longitudinal cut view of another example of a structural element of a fluid flow regulation assembly according to the present disclosure.

FIGS. 7a-c show the embodiment of FIG. 4 in other perspectives and with more detail. As already pointed out before, the embodiment of a large vibration attenuation section 9 extending over a majority of the area of the rear wall 25 has the advantage that a large range of vibration frequencies can be effectively attenuated. As it can be seen in FIG. 8, the dampening element 29 does not have to be attached to the inner side of the structure element, where the decay profile is visible, but may alternatively, or in addition, be placed at the other side, i.e. the outer side of the structure element 11. However, for aesthetic reasons, it may be desirable to arrange both the vibration attenuation section 9 and the dampening element 29 at the inner side of the structure 11. From a technical point of view. the attenuation of vibrations may work similarly well if the vibration attenuation section 9 and/or the dampening element 29 is arranged at the outer side of the structure element 11. Thus, for safety reasons in view of flammability and/or product certification, it may be beneficial to arrange the dampening element 29 at the outer side of the structure 11.

FIGS. 9a-i show different examples of dampening elements 29 and where they can be placed in relation to the vibration attenuation section 9. In FIG. 9a, the dampening element 29 covers the complete vibration attenuation section 9 from the inner side, so that the vibration attenuation is not visible from the outer side of the structure element 11. A smaller dampening element 29 covering only a part of the vibration attenuation section 9 may be sufficient to effectively adsorb vibrations of the vibration attenuation section 9. For example, as shown in FIG. 9b, only the thinner portions of the vibration attenuation section 9 may be covered by one or more layers of soft dampening material 29. FIG. 9c shows a dampening element 29 attached to the outer side of this structure element, where the material thickness of the vibration attenuation section 9 is thin. The dampening element 29 comprises a sandwich layer structure of a first layer 37 of soft material and a second layer 39 of stiffer material. The stiffer material of the second layer 39 may be the same material that the structure element 11 is made of or another material, such as aluminum. The first softer layer 37 and/or the stiffer second layer 39 may be comprised of a sandwich layer structure itself. The dampening element 29 may function as a support structure 21 as well as providing a dampening effect for adsorbing vibrations of the vibration attenuation section 9.

The embodiment shown in FIG. 9d shows that the vibration attenuation section 9 may comprise a hole 41 in the structure element 11. As shown in FIG. 9e, the dampening element 29 may comprise a coating or filling material covering at least parts of the vibration attenuation section 9 and/or filling the hole 41. In the embodiment of FIG. 9f, the dampening element 29 comprises a piezo element transforming energy of the vibrations into electric energy to be harvested or transformed into heat by an electric resistance. As shown in FIG. 9g, the soft first layer 37 of the sandwich structure of the dampening element 29 may cover a larger area than the stiffer second layer 39. The stiffer second layer 39 may be a metal sheet, i.e. of aluminum. The soft first layer 37 may be located between the stiffer second layer 39 and the structure element 11 as shown in FIGS. 9c, d, g h. As shown in FIG. 9h, the embodiment of FIG. 9g may also be equipped with a piezo element for transforming energy of the vibrations into electric energy to be harvested or transformed into heat by an electrical resistance. A piezo element or another kind of vibration sensing element may also be used to measure the vibrations for monitoring purposes. In the embodiment of FIG. 9i, the damping element 29 is attached to the outer side of the structural element 11 and covers that fraction of the vibration attenuation section 9 that has a minimum material thickness.

Figure 10A:
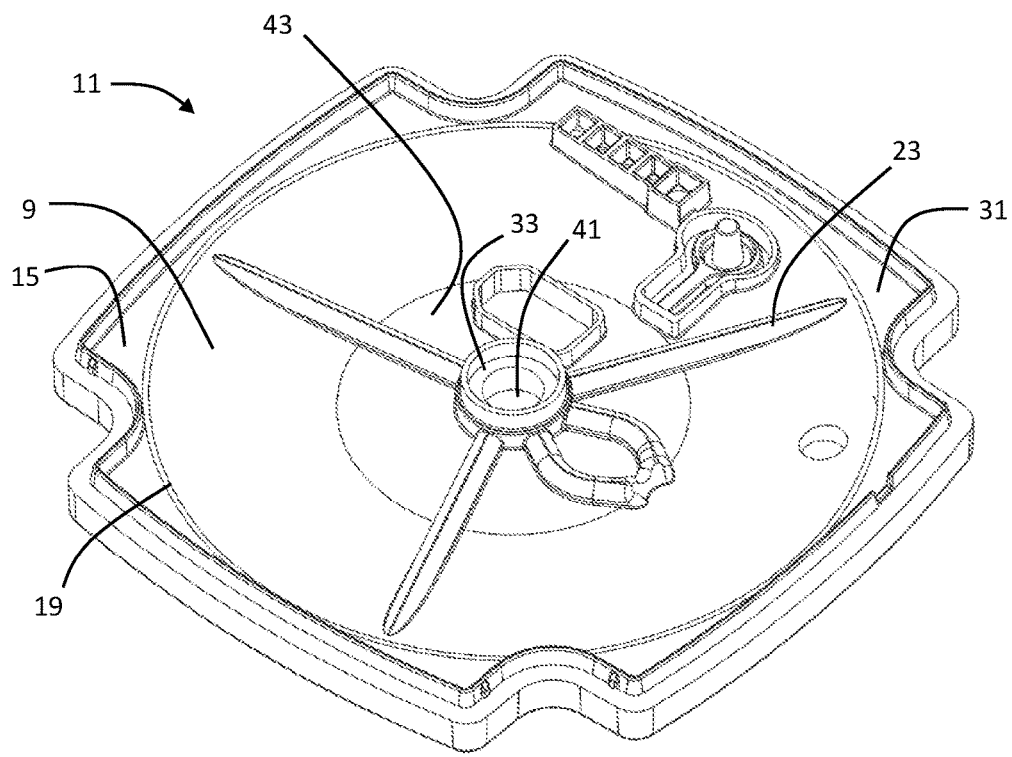
FIG. 10a is a perspective view of another example of a structural element of a fluid flow regulation assembly according to the present disclosure.
Figure 10B:
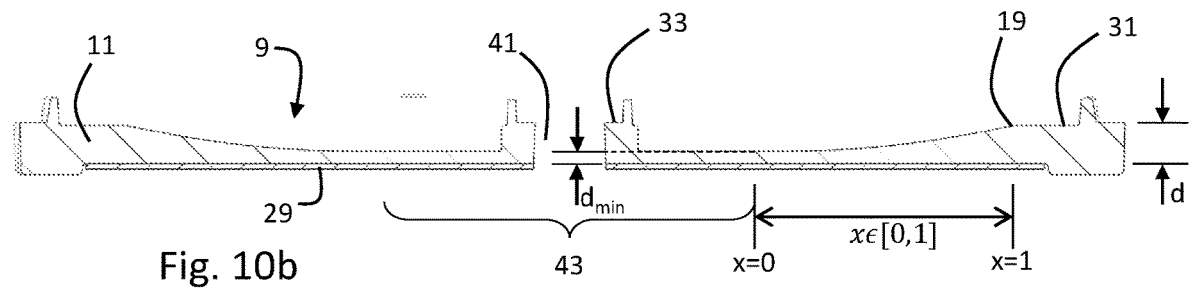
Figure 10C:
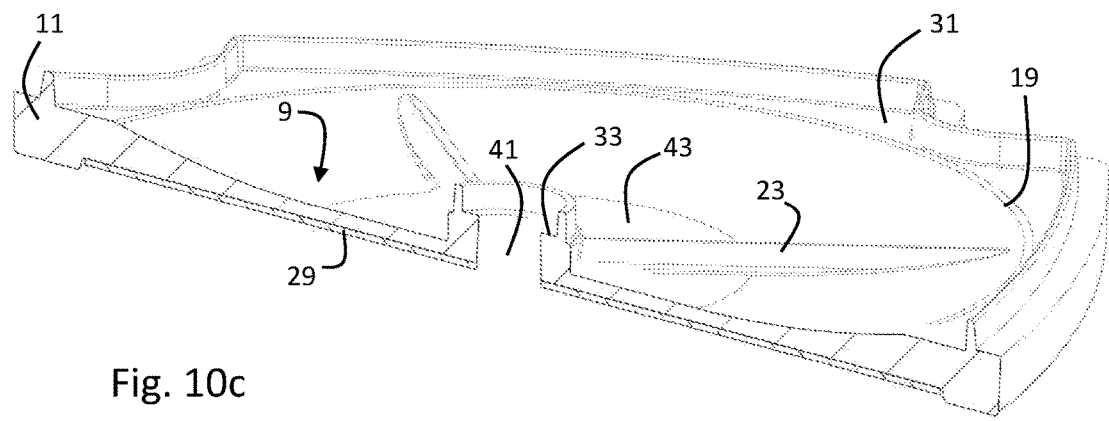

FIGS. 10a-c show a structural element 11 in the form of a lid of an electronics housing 7 of a pump assembly 1 according to FIG. 1b. Similar to the embodiment shown in FIG. 2a, the vibration attenuation section 9 extends over the majority of a front wall 15 defined by the structural element 11. However, it is important to note that the vibration attenuation section 9 extends here over an annular area at the inner side of the structural element 11. This means that the vibration attenuation section 9 rings an inner second structure section 33 to protect it from vibrations traveling from an outer first structure section 31. The vibration attenuation section 9 has a one-sided material thickness decay profile, wherein the material thickness h(x) of the vibration attenuation section 9 reduces from an outer rim 19 of the vibration attenuation section 9, where the structural element 11 has a nominal material thickness d, to a central area 43 of a minimum material thickness. The vibration attenuation section 9 has a central hole 41 formed by the inner second structure section 33. It should be noted that the decay profile is one-sided here, because there is no decay profile from the inner second structure section 33 radially outward. The structural element 11 is further equipped with a support structure 21 comprising ribs or webs 23 extending from the inner second structure section 33 radially in a star-like fashion partly across the vibration attenuation section 9 for improving the structural integrity of the structural element 11. The support structure 21 further comprises an annular reinforcement of the inner second structure section 33 around the hole 41. The embodiment of FIGS. 10a-c efficiently attenuates vibrations traveling from a side wall 17 radially inward along the front wall 15, so that the inner second structure section 33 only receives none or effectively attenuated vibrations above the predetermined minimum vibration frequency. As visible in FIGS. 10b,c, a dampening element 29 is in this embodiment attached to the outside of the structural element 11 and covers the complete vibration attenuation section 9.

Figure 11A:
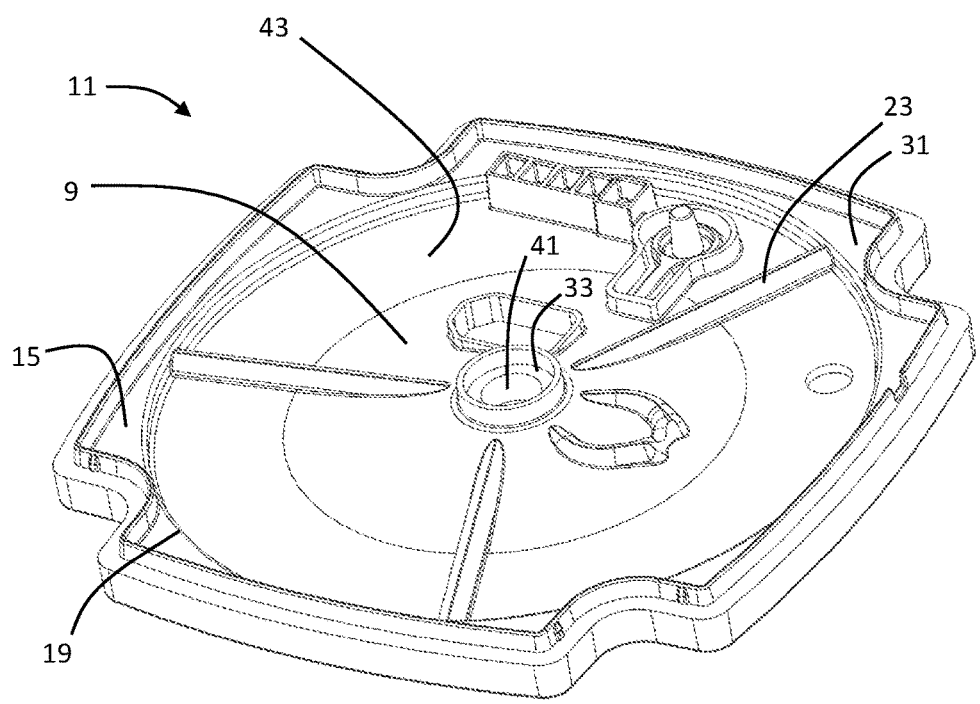
FIG. 11a is a perspective view of another example of a structural element of a fluid flow regulation assembly according to the present disclosure.
Figure 11B:
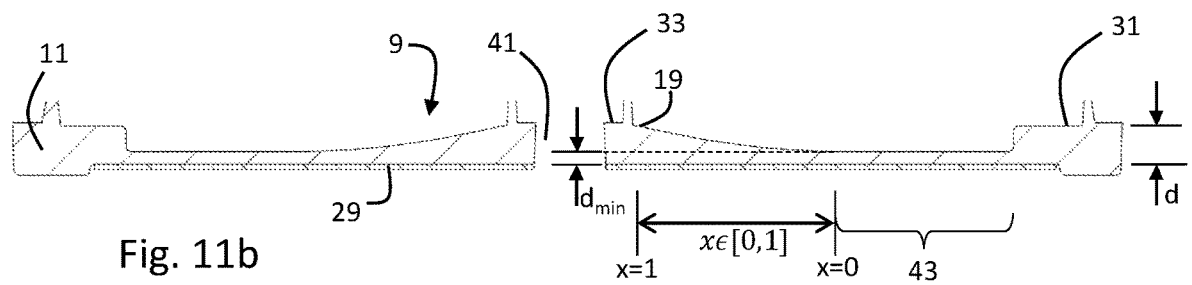
Figure 11C:
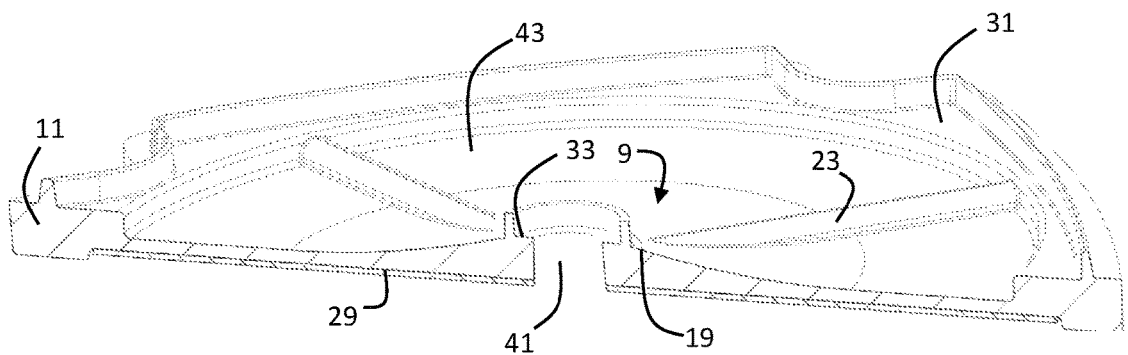

The embodiment shown in FIGS. 11a-c differs from the embodiment of FIG. 10a-c in that the one-sided decay profile is reversed, such that the material thickness decays from the center radially outward towards an annular outer area 43 of minimal material thickness. This is particularly beneficial if the inner second structure section 33 of the structural element 11 is exposed to vibrations originating from the source of vibrations, e.g. power electronics mounted thereto. Such vibrations are then attenuated on its way radially outward along the front wall 15 of the structural element 11, so that none or only attenuated vibrations above the predetermined minimum vibration frequency reach the outer first structure section 31 and the side walls 17 of the electronics housing 7.

Figure 12A:
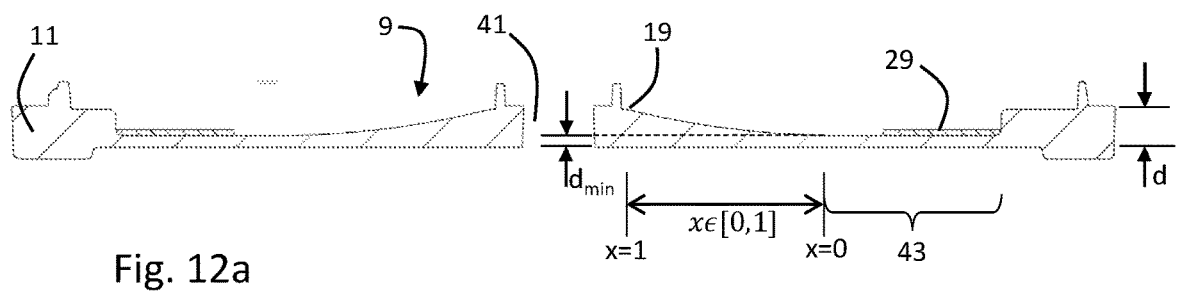
FIG. 12a is a longitudinal cut view of another example of a structural element of a fluid flow regulation assembly according to the present disclosure.
Figure 12B:
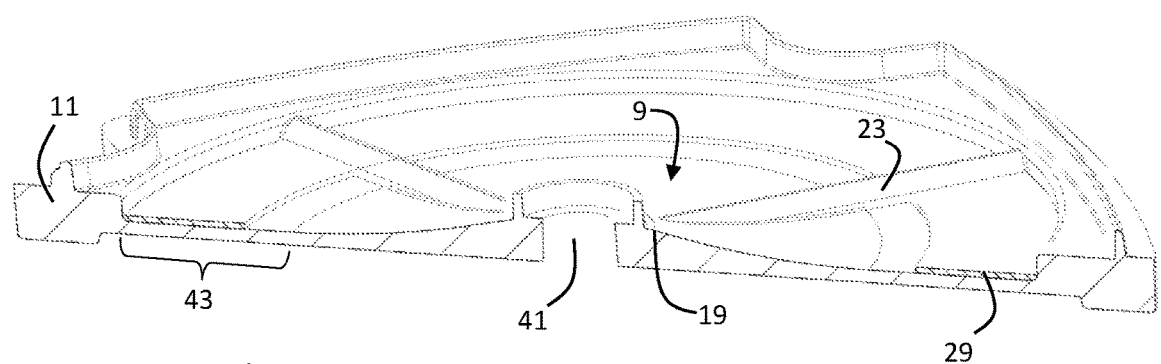

FIGS. 12*a, b* show an alternative embodiment of the dampening element 29 to be applicable in connection with the embodiment of the structural element 11 according to FIGS. 1I ac. The dampening element 29 of FIG. 11*a* has an annular shape covering, from the inner side, only partly the vibration attenuation section 9 in the area 43 of thinnest material at a radially outer area of the vibration attenuation section 9. This may be sufficient to efficiently absorb vibrations of the vibration attenuation section 9.

Figure 13A:
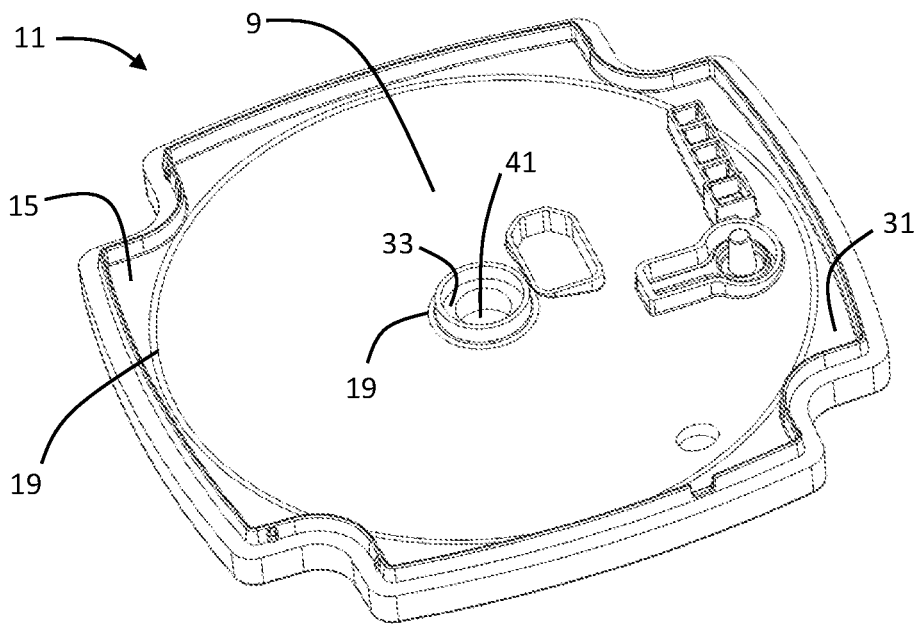
FIG. 13a is a perspective view of another example of a structural element of a fluid flow regulation assembly according to the present disclosure.
Figure 13B:
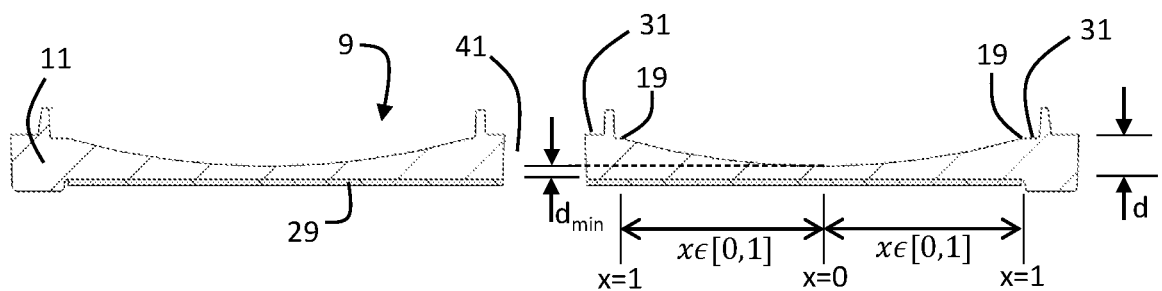
Figure 13C:
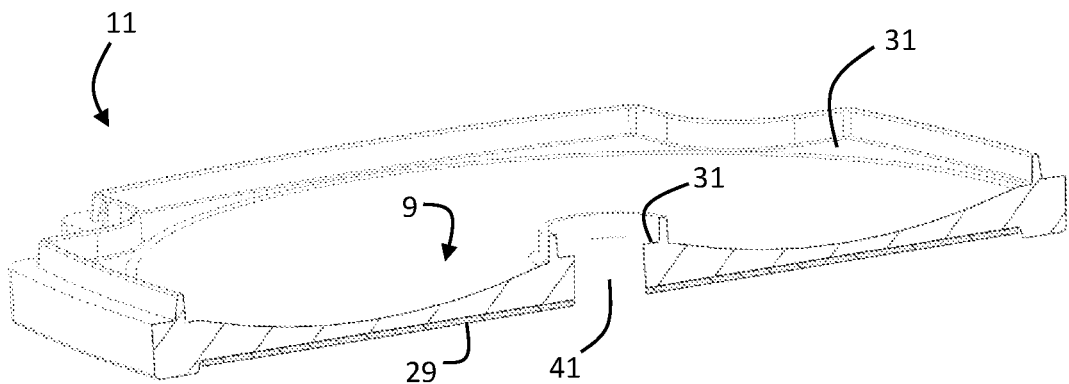

The embodiment of FIGS. 13*a-c* shows a combination of the embodiments of FIGS. 10*a-c* and FIGS. 11*a-c*, wherein the decay profile is two-sided, i.e. the material thickness decays from the center of the structural element 11 radially outward and rises again towards the outer rim 19 of the vibration attenuation section 9. This embodiment has the advantage that vibrations traveling radially outward as well as radially inward are effectively attenuated. The range of vibration frequencies may, however, be more limited compared to the embodiments of FIGS. 10*a-c* and FIGS. 11*a-c*.

Figure 14A:
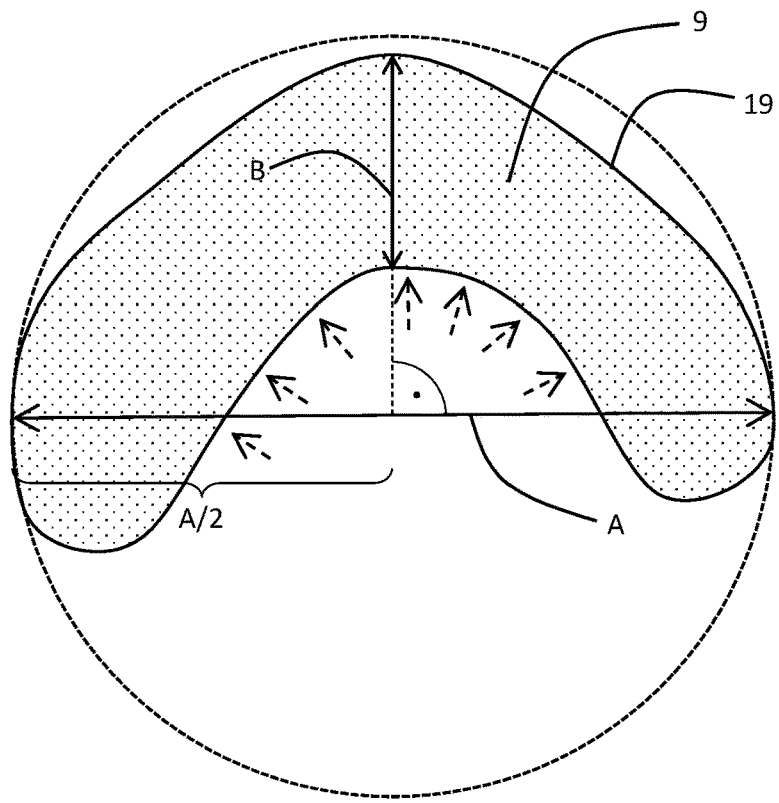
FIGS. 14a and 14b are schematic views showing rotationally asymmetric areas of vibration attenuation section of a structural element of a fluid flow regulation assembly according to the present disclosure.
Figure 14B:
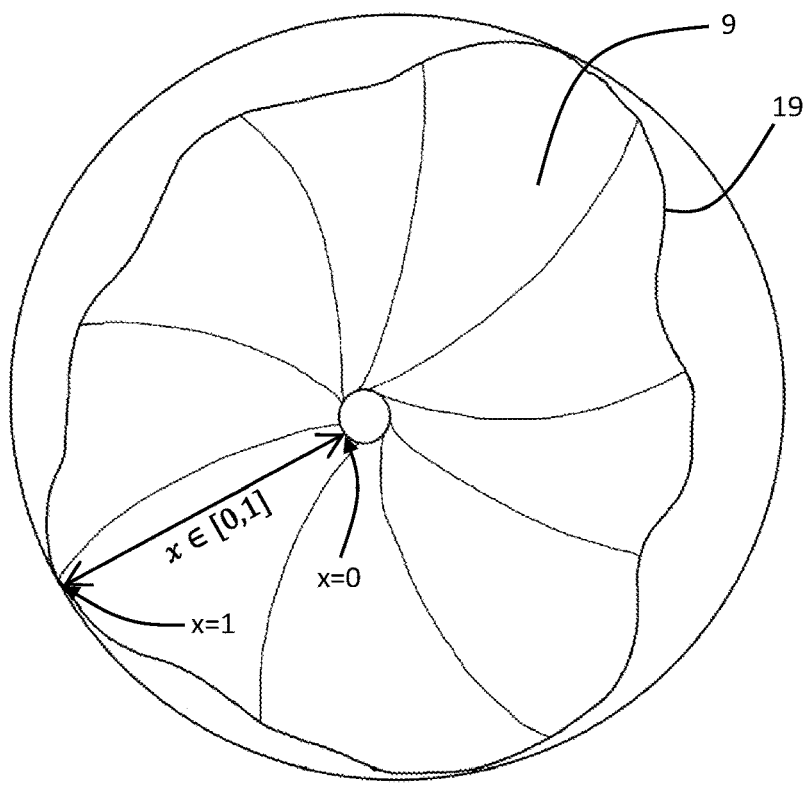

FIGS. 14*a, b* schematically show that the vibration attenuation section 9 can have any arbitrary shape and may be in particular rotationally asymmetric. The area of the vibration attenuation section 9 defines a first distance A along a first straight virtual line between those two points of the area that have the largest distance to each other. Furthermore, the area defines a second distance B along a second straight virtual line intersecting the center of the first virtual line at a right angle. The second distance B is the distance between those two points of the area on the second virtual line that have the largest distance to each other. The first distance A is preferably larger than the second distance B at least by 10%. The direction of the decay profile should be aligned with the traveling direction of the vibrations. For the banana-like shape of the vibration attenuation section 9 shown in FIG. 14*a*, the traveling direction of the vibrations may be radially as indicated by dashed arrows, i.e. the distance B may correspond to the distance D. In order to effectively attenuate vibrations of a certain frequency range, the distance D should fulfil the formula $$D \geq 0.5 \frac{c_{red}}{f_{min}},$$

wherein $f_{min}$ is the minimum vibration frequency and $c_{red}$ is the speed of sound along the structural element where its material thickness is minimal. In other words, the vibration attenuation section 9 should be large enough, such that the distance D is larger than or equal to half of the wavelength of the vibrations along the structural element where its material thickness is minimal. The minimal material thickness should be smaller than or equal to half of the nominal material thickness d of the structural element 11 outside of the vibration attenuation section 9. As shown in FIG. 14*b*, the material thickness may decay from a nominal material thickness d outside of the vibration attenuation section 9 along the decay profile to a minimal material thickness. The path along the decay profile may be parameterized by a normalized location variable x in the interval ranging from x=0, where the material thickness is thinnest, to x=1, where the material thickness reaches the nominal material thickness d of the structural element 9 outside of the vibration attenuation section 9.

Figure 15A:
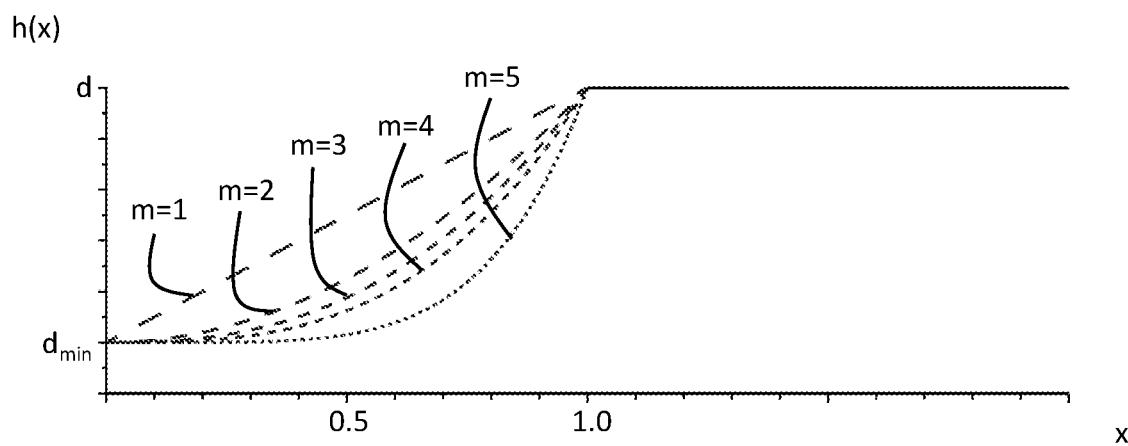
FIGS. 15a and 15b are graphs showing different examples of decay profiles for the material thickness h(x) as a function of x, wherein x is a location variable along the decay profile against the traveling direction of the vibrations.
Figure 15B:
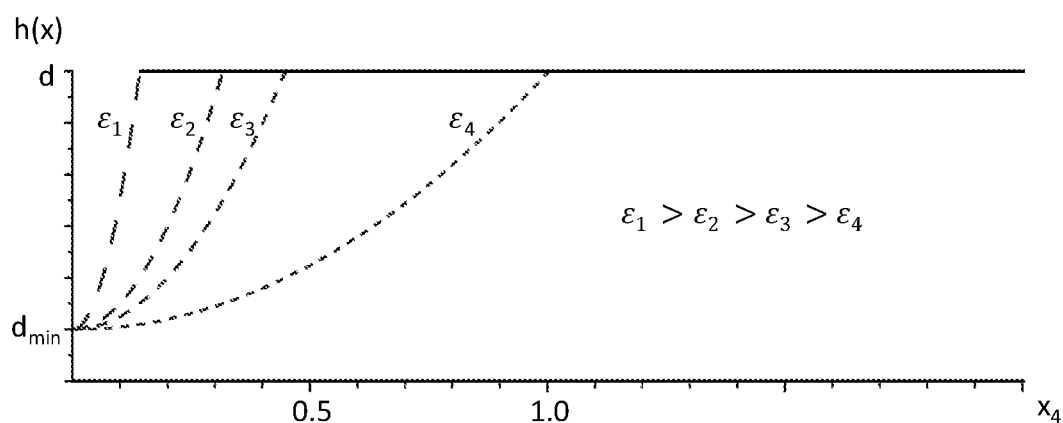

FIGS. 15*a,b* show different alternative shapes of the decay profile as a function h(x) of the material thickness for values of the normalized location variable x ranging from x=0 where the material thickness is minimal, i.e. h(x=0)= $d_{min}$, to x=1 at the rim 19. where the material thickness corresponds to the nominal material thickness d of the structural element 11 outside of the vibration attenuation section 9, i.e. h(x=1)=d. The function h(x) of the material thickness may be parameterized by $$h(x)=\varepsilon x^m,$$

wherein $\varepsilon$ is a small value parametrizing the inverse of the size of the area of the at least one vibration attenuation section 9 and m≥1, preferably m≥2, is an exponent value determining the steepness of the decay profile. FIG. 15*a* shows different alternatives of the decay profile with the same value of the E and different values of m. FIG. 14*b* shows the decay profile h(x) for an exponent value m=2 and different values of c parametrizing the size of the area covered by the vibration attenuation section 9. The x-axis in FIG. 15*b* is shown for the smallest value $\varepsilon_4$, i.e. x=$x_4$. For an efficient attenuation of a large range of vibration frequencies, the second derivative, i.e.

$$\frac{d^2 h}{dx^2},$$

should be non-zero. Therefore, the exponent value m should be equal to or larger than 2. It should be noted that m is preferably an integer, but may be a real number.

In order to reduce the risk of reflections, an upper limit preferably applies for the steepness of the decay profile, i.e. the first derivative $$\frac{dh}{dx}$$

of the material thickness as a function of location x along the travel path of the vibrations along the decay profile. The steepness of the thickness decay may be highest at a rim of the vibration attenuation section 9, i.e. for x=1, where the vibrations enter the vibration attenuation section 9. The steepness $$\frac{dh}{dx}$$

of the decay of the material thickness h(x) may fulfil the following border condition for all values of x:

$$\frac{dh}{dx} \leq \left| \sqrt{2\pi d f_{min}} \left( \frac{12\rho}{E} \right)^{0.25} \right|,$$

wherein d is the nominal material thickness of the structural element 9 outside of the vibration attenuation section 9, $f_{min}$ is the minimum vibration frequency, $\rho$ is the density of the material of the structural element 9 and the E is the Young modulus of the material of the structural element 9.

Where, in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustrative examples of the disclosure. It is to be understood that any feature described in relation to any one embodiment may be used alone, or in combination with other features described, and may also be used in combination with one or more features of any other of the embodiments, or any combination of any other of the embodiments. While at least one exemplary embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alternatives can be made without departing from the spirit and scope of the disclosure, which should be determined from the appended claims and their legal equivalents.

While specific embodiments of the invention have been shown and described in detail to illustrate the application of the principles of the invention, it will be understood that the invention may be embodied otherwise without departing from such principles.

LIST OF REFERENCE SYMBOLS 1 fluid flow regulation assembly
3 pump housing
5 motor housing
7 electronics housing
9 vibration attenuation section
11 structural element
13 opening
14 display/HMI
15 front wall
17 side wall
19 rim of the vibration attenuation section
21 support structure
23 ribs/webs
25 rear wall
27 side wall of the electronics housing
29 dampening element
31 first structural section
33 second structural section
35 mounting point
37 first lea of dampening element
39 second lea of dampening element
41 hole
43 area of minimal material thickness
R rotor axis
L longitudinal axis of structural element
d nominal material thickness of structural element outside of vibration attenuation section
$d_{min}$ minimum material thickness
x location variable
h(x) function of material thickness along decay profile
$f_{min}$ pre-determined minimum vibration frequency
A largest distance of the two points of vibration attenuation section
B largest distance of the two points of vibration attenuation section on line that intersects distance A at the center at a right angle
m exponent value
ε parameter

What is claimed is:

1. A fluid flow regulation assembly comprising:
movable parts for being actively mechanically driven, wherein the movable parts include at least one fluid flow regulating body for regulating a fluid flow and a rotor of a motor for driving the regulating body;
power electronics for controlling the motor, wherein at least one of the movable parts and the power electronics are a source of vibration; and
static parts exposed to traveling vibrations originating from the source of vibration, wherein:
the static parts include at least one of the group comprising: a pump housing, a valve housing, a motor housing, a pump base and an electronics housing;
the static parts comprise a structural element with at least one vibration attenuation section for attenuating vibrations that originate from the source of vibration, travel along said structural element, and have a vibration frequency above a pre-determined minimum vibration frequency;
the at least one vibration attenuation section has a material thickness decay profile in a traveling direction of the vibrations;
the structural element comprises at least one wall section;
the at least one vibration attenuation section is arranged at the at least one wall section; and
the at least one vibration attenuation section extends over an area of rotationally asymmetric shape.

2. The fluid flow regulation assembly according to claim 1, wherein the fluid flow regulation assembly is a pump assembly, wherein the at least one fluid flow regulating body is an impeller or a displacement body, wherein the at least one vibration attenuation section is a part of the at least one wall section.

3. The fluid flow regulation assembly according to claim 1, wherein the fluid flow regulation assembly is a valve assembly, wherein the at least one fluid flow regulating body is a valve body, the at least one vibration attenuation section forming a part of the at least one wall section and the at least one vibration attenuation section defining a surface of the at least one wall section.

4. The fluid flow regulation assembly according to claim 1, wherein the material thickness decay profile is one-sided, the at least one vibration attenuation section extending continuously, without interruption, from one portion of the at least one wall section to another portion of the at least one wall section.

5. The fluid flow regulation assembly according to claim 1, wherein the structural element comprises a material thickness smoothly and/or stepwise reducing in a traveling direction of the vibrations from a rim of the at least one vibration attenuation section having a maximum material thickness to a point, line or area of minimum or zero material thickness of the at least one vibration attenuation section, the at least one vibration attenuation section being configured to dampen the vibrations in the at least one wall section.

6. The fluid flow regulation assembly according to claim 1, wherein the at least one vibration attenuation section has a functionality of an acoustic black hole in the structural element.

7. The fluid flow regulation assembly according to claim 1, wherein the structural element comprises at least one support structure, comprising a rib or a web, extending at least partly across the at least one vibration attenuation section.

8. The fluid flow regulation assembly according to claim 7, wherein the at least one support structure is defined by a locally non-reduced or less reduced material thickness of the structural element.

9. The fluid flow regulation assembly according to claim 1, wherein:
the structural element defines a predictable main path of travel of the vibrations along said structural element;
the predictable main path of travel extends from a first structure section of the structural element towards a second structure section of the structural element; and
the at least one vibration attenuation section is arranged between the first structure section and the second structure section.

10. The fluid flow regulation assembly according to claim 1, wherein:
the at least one vibration attenuation section separates a first structure section of the structural element and a second structure section of the structural element; and
the first structure section is exposed to traveling vibrations caused by the source of vibration and the second structure section receives essentially only vibrations below the pre-determined minimum vibration frequency and/or vibrations attenuated by the at least one vibration attenuation section.

11. The fluid flow regulation assembly according to claim 1, wherein:
the structural element comprises a first material having a first Young modulus;
the at least one vibration attenuation section is at least partly covered by or equipped with a dampening element comprising a second material with a second Young modulus; and
the second Young modulus is smaller than the first Young modulus.

12. The fluid flow regulation assembly according to claim 1, wherein:
the structural element comprises a plurality of wall sections defined by at least one inner or outer edge between the wall sections; and
the at least one vibration attenuation section is arranged at least one of at a largest one of the wall sections and at one of the wall sections being located closest to the source of vibration.

13. The fluid flow regulation assembly according to claim 1, wherein:
the at least one vibration attenuation section extends over an area of at least 25 percent of the at least one wall section.

14. The fluid flow regulation assembly according to claim 1, wherein:
a plurality of vibration attenuation sections are arranged at the at least one wall section; and
the vibration attenuation sections are separated from each other by at least one support structure.

15. The fluid flow regulation assembly according to claim 1, wherein the structural element is at least part of the electronics housing accommodating motor control electronics.

16. The fluid flow regulation assembly according to claim 1, wherein the at least one vibration attenuation section extends in a traveling direction of the vibrations for at least three times of a material thickness that the structural element has outside of the at least one vibration attenuation section.

17. The fluid flow regulation assembly according to claim 1, wherein:
the at least one vibration attenuation section has a material thickness equal to or larger than a minimum material thickness;
the minimum material thickness is equal to or smaller than half of the material thickness that the structural element has outside of the at least one vibration attenuation section.

18. The fluid flow regulation assembly according to claim 1, wherein:
the at least one vibration attenuation section has a material thickness equal to or larger than a minimum material thickness;
the speed of sound at the minimum material thickness is equal to or smaller than $1/\sqrt{2}$ of the speed of sound at the material thickness that the structural element has outside of the at least one vibration attenuation section.

19. The fluid flow regulation assembly according to claim 1, wherein:
the material thickness decay profile has one or more of a smoothly reducing steepness in the traveling direction of the vibrations and a stepwise reducing steepness in the traveling direction of the vibrations.

20. The fluid flow regulation assembly according to claim 1, wherein the at least one vibration attenuation section is at least partly covered by a dampening element that is an active dampening element, a semi-active dampening element or a passive dampening element, the at least one vibration attenuation section defining a portion of a material thickness of the at least one wall section.

21. The fluid flow regulation assembly according to claim 20, wherein the dampening element comprises at least one of the group comprising:
a coating;
an adhesive;
a pad;
a gel;
a gasket material;
one or more polymeric films;
a sandwich structure of different layers of material;
a sandwich structure of different layers of stiffness;
a piezo element transforming energy of the vibrations into electric energy that is harvested or transformed into heat by an electrical resistance;

a vibration sensing element for measuring the vibrations;
a PVDF film; and
a quartz crystal.

22. A fluid flow regulation assembly comprising:

movable parts for being actively mechanically driven, wherein the movable parts include at least one fluid flow regulating body for regulating a fluid flow and a rotor of a motor for driving the regulating body;

power electronics for controlling the motor, wherein at least one of the movable parts and the power electronics are a source of vibration; and static parts exposed to traveling vibrations originating from the source of vibration, wherein:

the static parts include at least one of the group comprising: a pump housing, a valve housing, a motor housing, a pump base and an electronics housing;

the static parts comprise a structural element with at least one vibration attenuation section for attenuating vibrations that originate from the source of vibration, travel along said structural element, and have a vibration frequency above a pre-determined minimum vibration frequency;

the at least one vibration attenuation section has a material thickness decay profile in a traveling direction of the vibrations;

the structural element comprises at least one wall section;

the at least one vibration attenuation section is arranged at the at least one wall section;

the at least one vibration attenuation section extends over an area of any shape;

the area defines a distance (D) between two points of the area that have a largest distance to each other in the traveling direction of the vibrations;

said distance (D) fulfils the formula $$D \geq 0.5 \frac{c_{red}}{f_{min}};$$

and $f_{min}$ in is the minimum vibration frequency and c_red is the speed of sound along the f min structural element where a material thickness in the at least one vibration attenuation section is minimal.

23. A fluid flow regulation assembly comprising:

movable parts for being actively mechanically driven, wherein the movable parts include at least one fluid flow regulating body for regulating a fluid flow and a rotor of a motor for driving the regulating body;

power electronics for controlling the motor, wherein at least one of the movable parts and the power electronics are a source of vibration; and static parts exposed to traveling vibrations originating from the source of vibration, wherein:

the static parts include at least one of the group comprising: a pump housing, a valve housing, a motor housing, a pump base and an electronics housing;

the static parts comprise a structural element with at least one vibration attenuation section for attenuating vibrations that originate from the source of vibration, travel along said structural element, and have a vibration frequency above a pre-determined minimum vibration frequency;

the at least one vibration attenuation section has a material thickness decay profile in a traveling direction of the vibrations;

the structural element comprises at least one wall section;

the at least one vibration attenuation section is arranged at the at least one wall section;

the at least one vibration attenuation section extends over an area of any shape;

the area defines a first distance along a first straight virtual line between two points of the area that have the largest distance to each other;

the area defines a second distance along a second straight virtual line intersecting a center of the first virtual line at a right angle;

the second distance is a distance between two points of the area on the second virtual line that have the largest distance to each other; and the first distance is at least 10% larger than the second distance.

* * * * *